United States Patent
Kim et al.

(10) Patent No.: US 11,084,581 B2
(45) Date of Patent: Aug. 10, 2021

(54) MOBILE TERMINAL AND CONTROL METHOD THEREFOR

(71) Applicant: LG ELECTRONICS INC., Seoul (KR)

(72) Inventors: Jungsik Kim, Seoul (KR); Sunho Yang, Seoul (KR); Namjin Kim, Seoul (KR); Joongtae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 277 days.

(21) Appl. No.: 16/097,101

(22) PCT Filed: May 3, 2016

(86) PCT No.: PCT/KR2016/004664
§ 371 (c)(1),
(2) Date: Oct. 26, 2018

(87) PCT Pub. No.: WO2017/188492
PCT Pub. Date: Nov. 2, 2017

(65) Prior Publication Data
US 2019/0094849 A1    Mar. 28, 2019

(30) Foreign Application Priority Data
Apr. 29, 2016    (KR) .......................... 10-2016-0053199

(51) Int. Cl.
*B64C 39/02*    (2006.01)
*G05D 1/00*    (2006.01)
(Continued)

(52) U.S. Cl.
CPC ............ *B64C 39/024* (2013.01); *G01S 19/38* (2013.01); *G05D 1/0016* (2013.01);
(Continued)

(58) Field of Classification Search
CPC ............ B64C 39/024; B64C 2201/027; B64C 2201/127; B64C 2201/141;
(Continued)

(56) References Cited

U.S. PATENT DOCUMENTS

| | | |
|---|---|---|
| 2011/0288695 A1 | 11/2011 | Gariepy et al. |
| 2012/0029731 A1 | 2/2012 | Waldock et al. |

(Continued)

FOREIGN PATENT DOCUMENTS

| | | |
|---|---|---|
| JP | 2012-198883 A | 10/2012 |
| KR | 10-2014-0048416 A | 4/2014 |

*Primary Examiner* — Anshul Sood
(74) *Attorney, Agent, or Firm* — Birch, Stewart, Kolasch & Birch, LLP

(57) ABSTRACT

A mobile terminal can include a display unit; a wireless communication unit configured to wireless communicate with a drone; a sensing unit; and a controller configured to sense a first touch signal of touching at least one partial area of map content displayed by the display unit, the first touch signal including a drag touch signal of moving along a first path with a first pressure and a first speed, in which the controller is further configured to set a moving path of the drone including a departure point of the drone and an arrival point of the drone based on the first path of the drag touch signal, set a moving speed of the drone based on the first speed of the drag touch signal, set a moving altitude of the drone based on the first pressure of the drag touch signal, and control the wireless communication unit to transmit a control signal based on at least one of the set moving path, the set moving speed or the set moving altitude of the drone.

15 Claims, 17 Drawing Sheets

(51) Int. Cl.
  *G05D 1/02*    (2020.01)
  *H04N 5/232*   (2006.01)
  *H04N 13/239*  (2018.01)
  *H04M 1/725*   (2021.01)
  *G01S 19/38*   (2010.01)
  *H04M 1/72415* (2021.01)
  *H04W 4/029*   (2018.01)
  *G08C 17/02*   (2006.01)
  *H04W 4/02*    (2018.01)
  *G06F 3/0488*  (2013.01)

(52) U.S. Cl.
  CPC ......... *G05D 1/0038* (2013.01); *G05D 1/0044* (2013.01); *G05D 1/0094* (2013.01); *G05D 1/0202* (2013.01); *G08C 17/02* (2013.01); *H04M 1/725* (2013.01); *H04M 1/72415* (2021.01); *H04N 5/23206* (2013.01); *H04N 5/23216* (2013.01); *H04N 5/23299* (2018.08); *H04N 5/232933* (2018.08); *H04N 13/239* (2018.05); *H04W 4/029* (2018.02); *B64C 2201/027* (2013.01); *B64C 2201/146* (2013.01); *G06F 3/04883* (2013.01); *G08C 2201/30* (2013.01); *G08C 2201/93* (2013.01); *H04M 2250/22* (2013.01); *H04W 4/026* (2013.01)

(58) Field of Classification Search
  CPC . B64C 2201/146; G01S 19/38; G05D 1/0016; G05D 1/0038; G05D 1/0044; G05D 1/0094; G05D 1/0202; G06F 3/0414; G06F 3/04883; G08C 17/02; G08C 2201/30; G08C 2201/93; H04M 1/725; H04M 1/72533; H04M 2250/22; H04N 5/23206; H04N 5/23216; H04N 5/232933; H04N 5/23299; H04N 13/239; H04W 4/026; H04W 4/029
  See application file for complete search history.

(56) References Cited

U.S. PATENT DOCUMENTS

| | | | |
|---|---|---|---|
| 2013/0304282 A1* | 11/2013 | Beggs | B64D 45/00 701/3 |
| 2014/0008496 A1 | 1/2014 | Ye et al. | |
| 2016/0327950 A1* | 11/2016 | Bachrach | G06F 3/00 |
| 2017/0213465 A1* | 7/2017 | Parekh | G08G 5/0086 |
| 2018/0246529 A1* | 8/2018 | Hu | G05D 1/0202 |
| 2018/0275647 A1* | 9/2018 | Li | G06F 3/04845 |
| 2018/0362158 A1* | 12/2018 | Zhang | B64C 39/024 |
| 2019/0011921 A1* | 1/2019 | Wang | G06T 7/70 |

* cited by examiner (a)  (b)

MOBILE TERMINAL AND CONTROL METHOD THEREFOR

CROSS-REFERENCE TO RELATED APPLICATIONS

This application is the National Phase of PCT International Application No. PCT/KR2016/004664, filed on May 3, 2016, which claims priority under 35 U.S.C. 119(a) to Patent Application No. 10-2016-0053199, filed in the Republic of Korea on Apr. 29, 2016, all of which are hereby incorporated by reference herein in their entirety.

TECHNICAL FIELD

The present invention relates to a mobile terminal and control method thereof, and more particularly, to a mobile terminal and control method thereof, suitable for setting at least one of a moving path, a moving speed and a moving altitude of a drone through a touch input signal of touching at least one partial area of a map content.

BACKGROUND OF THE INVENTION

Terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider improving structural parts and/or software parts of the terminal.

Recently, drones operated by individuals or companies tend to increase. Here, a drone means an unmanned flying object in an airplane or helicopter shape, which flies by a radio control signal.

Meanwhile, although there are various related art methods of setting a moving path, a moving altitude and a moving speed of a drone, it is still inconvenient for a user to manually manipulate a moving path of a drone and the like at each point.

SUMMARY OF THE INVENTION

Technical Task

The present invention is intended to solve the above problem and other problems. One technical task of one embodiment of the present invention is to provide a mobile terminal and control method thereof, in which a moving path including a departure point and an arrival point, a moving altitude and a moving speed of a drone are set by sensing a signal of touching at least one partial area of a map content in a state that the map content is outputted to a display unit and a control signal based on at least one of the moving path, the moving altitude and the moving speed is transmitted to the drone.

Technical Solutions

In one technical aspect of the present invention, provided herein is a mobile terminal, including a display unit, a wireless communication unit performing wireless communication with a drone, a sensing unit, and a controller sensing a first touch signal of touching at least one partial area of a map content in a state that the map content is outputted to the display unit, the first touch signal including a drag touch signal of moving along a first path at a first pressure and a first speed, the controller configured to set a moving path including departure and arrival points of the drone based on the first path, set a moving speed of the drone based on the first speed, set a moving altitude of the drone based on the first pressure, and control the wireless communication unit to transmit a control signal based on at least one of the set moving path, the set moving speed and the set moving altitude of the drone to the drone.

According to one aspect of the present invention, the controller may sense a second touch signal of touching a first area on the outputted map content within a preset time after sensing the first touch signal and transmit a signal for controlling a direction of a camera provided to the drone in response to the second touch signal and the direction of the camera may include a direction for the camera provided to the drone to photograph the first area.

According to one aspect of the present invention, the second touch signal may be sensed while the first signal is being sensed.

According to one aspect of the present invention, if the second touch signal is not sensed within the preset time after sensing the first touch signal, the controller may automatically set the first area.

According to one aspect of the present invention, the first pressure may correspond to at least one of a preset pressure sensed from the display unit and a preset distance of a pointer located vertical to the display unit.

According to one aspect of the present invention, if a signal indicating that the drone has arrived at the arrival point is received from the drone, the controller may transmit a signal for controlling the drone to return to the departure point to the drone.

According to one aspect of the present invention, after the moving path, altitude and speed of the drone haven been set, if a third touch signal is sensed, the controller may change the moving path, altitude and speed of the drone based on the third touch signal. And, the third touch signal may include a drag touch signal of moving along a second path at a second pressure and a second speed.

According to one aspect of the present invention, the controller may control an indicator based on at least one of the set moving path, speed and altitude of the drone to be outputted to the outputted map content.

In another technical aspect of the present invention, provided herein is a control method, including outputting a map content to a display unit, sensing a first touch signal of touching at least one partial area of the map content, the first touch signal comprising a drag touch signal of moving along a first path at a first pressure and a first speed, setting a moving path including departure and arrival points of a drone based on the first path, setting a moving speed of the drone based on the first speed, setting a moving altitude of the drone based on the first pressure, and transmitting a control signal based on at least one of the set moving path, the set moving speed and the set moving altitude of the drone to the drone through a wireless communication unit.

Advantageous Effects

Effects of a mobile terminal and control method thereof according to the present invention are described as follows.

According to at least one of embodiments of the present invention, it is advantageous in that a user can intuitively set a moving path, a moving altitude and a moving speed of a drone by inputting a path in a manner of touching a map content outputted to a mobile terminal at a predetermined pressure and speed.

According to at least one of embodiments of the present invention, it is advantageous in that a user can set a camera direction of a drone by touching an area on an outputted map content as well as set a moving path, a moving altitude and a moving speed of the drone intuitively.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE EMBODIMENTS

Figure 1A:
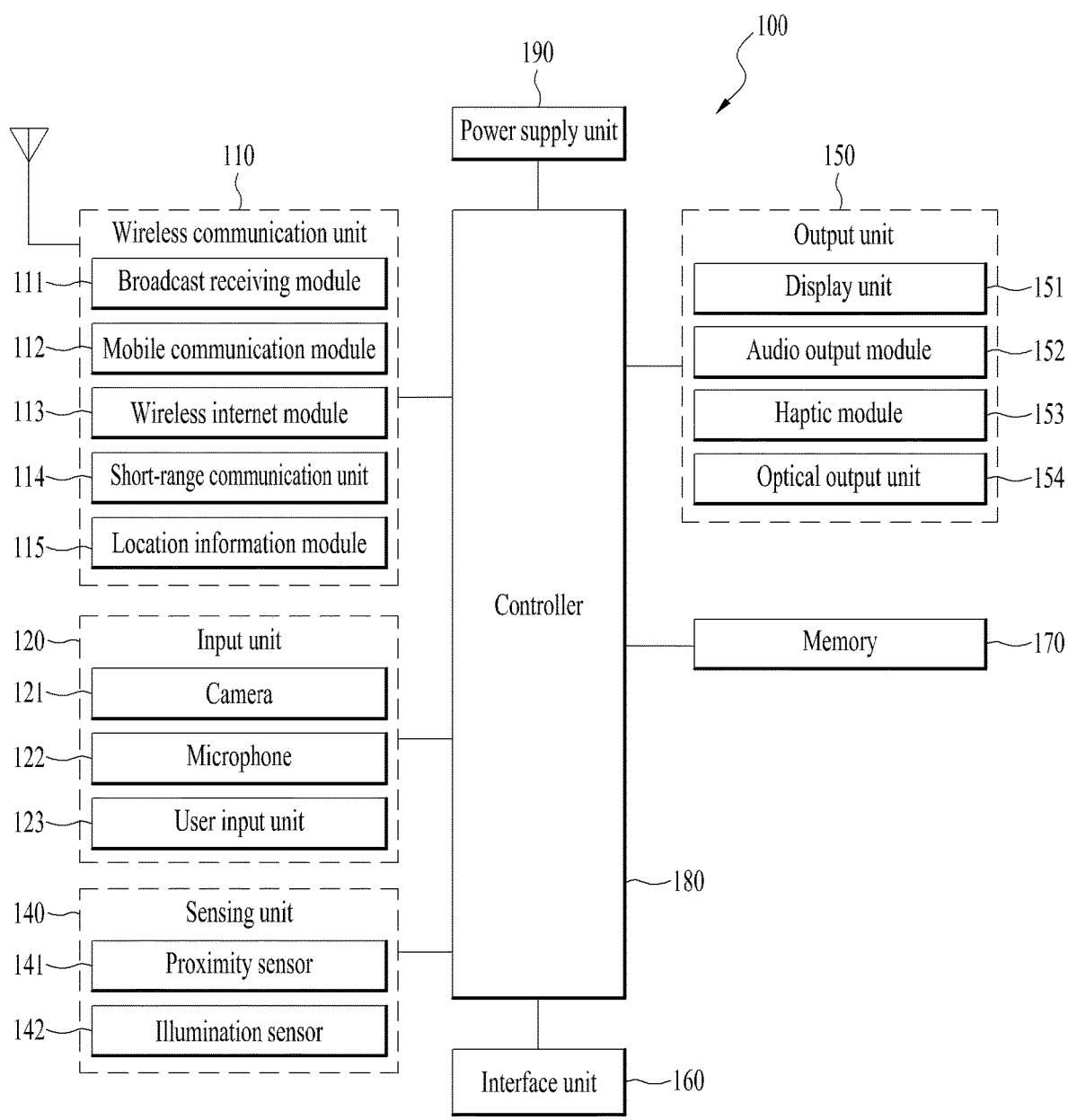
FIG. 1A is a block diagram to describe a mobile terminal related to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
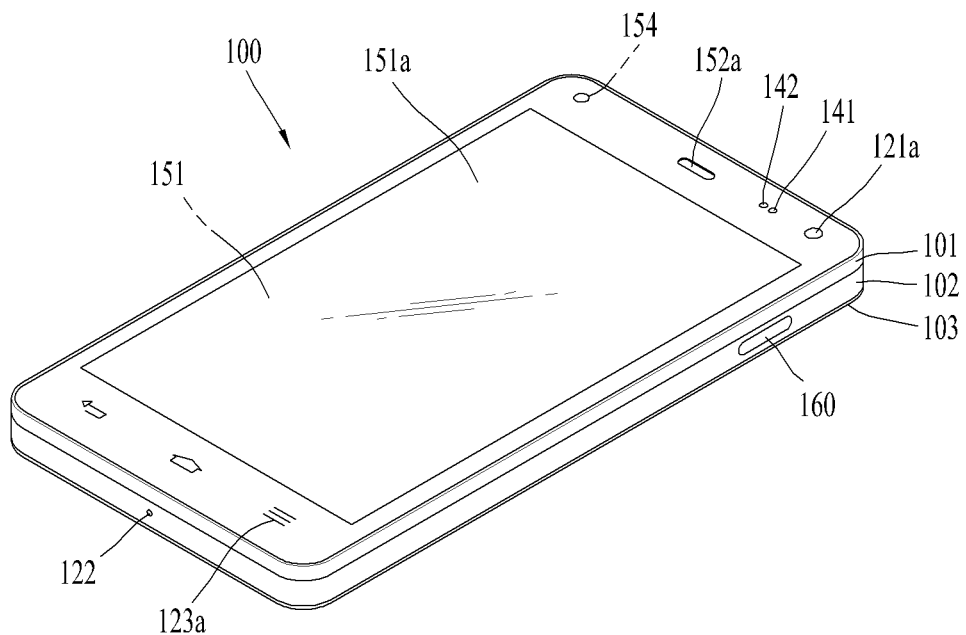
FIGS. 1B and 1C are conceptual diagrams for one example of a mobile terminal related to the present invention, viewed from different directions.
Figure 1C:
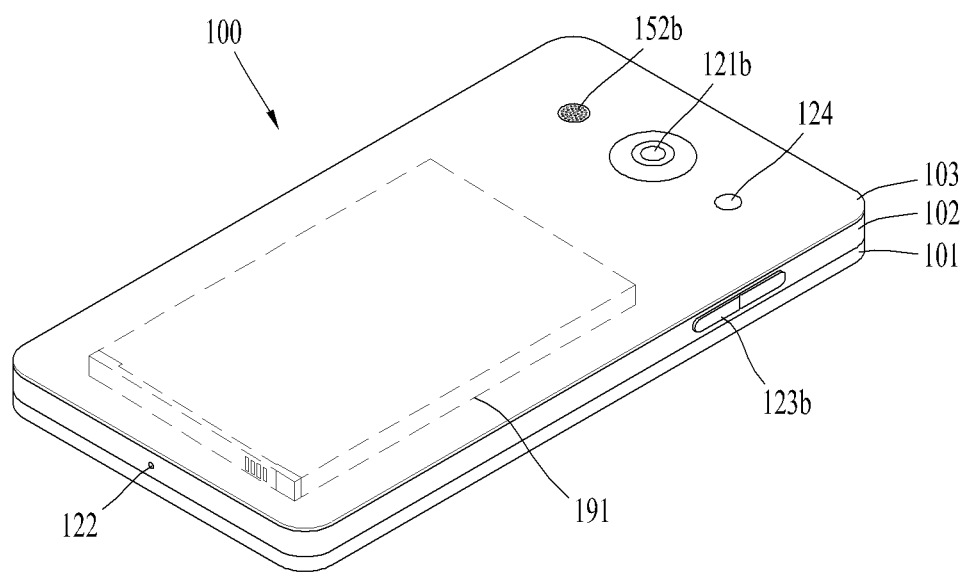

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The position-location module 115 is generally configured to detect, calculate, derive or otherwise identify a position of the mobile terminal. As an example, the position-location module 115 includes a Global Position System (GPS) module, a Wi-Fi module, or both. If desired, the position-location module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input.

Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 can receive external power or provide internal power and supply the appropriate power required for operating respective elements and components included in the mobile terminal 100. The power supply unit 190 may include a battery, which is typically rechargeable or be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Also, various embodiments can be implemented in the computer and similar recording materials using software, hardware and the combination of software and hardware.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

In the figure, the first operation unit 123a is a touch key, the invention is not limited thereto. For example, the first operation unit 123a a mechanical key, or a combination of a touch key and a touch key.

The contents input by the first and second operation units 123a and 123b are variously set can be. For example, the first operation unit 123a may issue a command such as a menu, a home key, a cancel, and the second operation unit 123b receives the first sound output from the first or second sound output unit 152a or 152b the size of the sound to be output, and the switch to the touch recognition mode of the display unit 151 can be input.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present invention, it can be displayed using a flexible display. In the following, this will be discussed in more detail with attached drawings.

Figure 2:
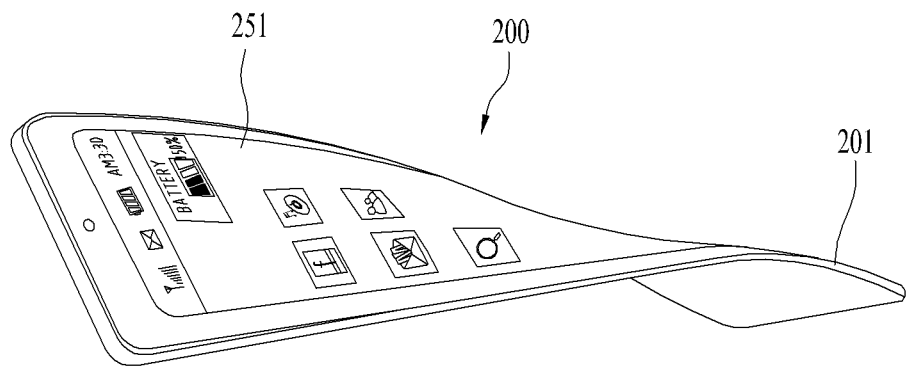
FIG. 2 is a conceptual diagram to describe another example of a deformable mobile terminal according to the present disclosure.

FIG. 2 is a conceptual view to describe another example of a deformable mobile terminal 200 according to the present invention.

Referring to FIG. 2, a display unit 251 may be configured deformable in response to an external force. This deformation may include at last one of curving, bending, folding, twisting, rolling, and combinations thereof. The deformable display unit 251 may be named "flexible display unit". In particular, the flexible display unit 251 may include a general flexible display, an electronic paper (also known as e-paper), and a combination thereof. In general, a mobile terminal 200 may be configured to include the same or similar features of the former mobile terminal 100 shown in FIGS. 1A to 1C.

Generally, a flexible display means a display that is light-weighted and non-fragile in a manner of being fabricated on a thin and flexible substrate having such properties of paper as curving, bending, folding, twisting, and rolling while maintaining the properties of an existing flat panel display.

The e-paper may be used to refer to a display technology that employs the properties of a general ink. The e-paper is different from the existing flat panel display in using reflective light. The e-paper is generally understood as changing displayed information by electrophoresis using twist balls or capsules.

In a state that the flexible display unit 251 is not deformed (for example, a state that the flexible display unit 251 has an infinite radius of curvature, referred to as a $1^{st}$ state), a display region of the flexible display unit 251 becomes a flat surface. In a state that the flexible display unit 251 is deformed from the $1^{st}$ state by an external force (for example, a state that the flexible display unit 251 has a finite radius of curvature, referred to as a $2^{nd}$ state), the display region may become a curved surface or a bent surface. As illustrated, information displayed in the second state may include a visual information outputted through the curved surface. The visual information may be implemented in a manner that light emission of each unit pixel (sub-pixel) arranged in a matrix configuration is controlled independently. In this case, the unit pixel denotes an elementary unit for representing a single color.

The flexible display unit 251 may enter not a flat state but a curved state (for example, a vertically curved state, a horizontally curved state, etc.) in the $1^{st}$ state. In doing so, if an external force is applied to the flexible display unit 251, the flexible display unit 251 may be deformed into a flat state (or a less curved state) or a more curved state.

If desired, the flexible display unit 251 may embody a flexible touchscreen by being combined with a touch sensor. If a touch is applied to the flexible touchscreen, the controller 180 (cf. FIG. 1A) can perform a control in response to the touch input. The flexible touchscreen may be configured to sense a touch input not only in the $1^{st}$ state but also in the $2^{nd}$ state.

Meanwhile, the mobile terminal 200 according to the modified example may include a deformation sensing means for sensing the deformation of the flexible display unit 251. The deformation sensing means may be included in the sensing unit 140 shown in FIG. 1A.

The deformation sensing means is provided to the flexible display unit 251 or the case 201 to sense information related to the deformation of the flexible display unit 251. Examples of such information related to the deformation of the flexible display unit 251 may include a deformed direction of the flexible display unit 251, a deformed degree of the flexible display unit 251, a deformed position of the flexible display unit 251, a deformed time of the flexible display unit 251, an acceleration for restoring the deformed flexible display unit 251, and the like. Besides, the information may include various kinds of information that can be sensed owing to the curving of the flexible display unit 251.

The controller 180 can change the information displayed on the flexible display unit 251 or generate a control signal for controlling a function of the mobile terminal 200, based on the information related to the deformation of the flexible display unit 251. Such information is typically sensed by the deformation sensing means.

The mobile terminal 200 according to the modified example may include a case 201 for accommodating the flexible display unit 251. The case 201 can be configured deformable together with the flexible display unit 251 in consideration of the property of the flexible display unit 251.

A battery (not shown in the drawing) provided to the mobile terminal 200 may be configured deformable by an external force together with the flexible display unit 251 in consideration of the property of the flexible display unit 251. In order to embody such a battery, it is able to employ a stack and folding scheme of stacking battery cells on each other.

The state deformation of the flexible display unit 251 is non-limited by the case of applying the external force. For example, the flexible display unit 251 can be deformed into the $2^{nd}$ state in response a command given by a user or application when the flexible display unit 251 is in the $1^{st}$ state.

Beyond using a mobile terminal grabbed with a user's hand, the mobile terminal may extend to a wearable device that is wearable on a user body. Examples of the wearable device include a smart watch, a smart glass, a head mounted display (HMD), and the like. Examples of the mobile terminal extending to the wearable devices shall be described as follows.

First of all, a typical wearable device can exchange data with (or interwork with) another mobile terminal 100. The short-range communication module 114 can sense or recognize a nearby wearable device capable of communicating with the mobile terminal 100. Moreover, if the sensed wearable device is a device authenticated to communicate with the mobile terminal 100, the controller 180 may transmit at least one portion of the data processed in the mobile terminal 100 to the wearable device via the short-range communication module 114, for example. Hence, a user can use the data processed in the mobile terminal 100 through the wearable device. For example, when an incoming call is received by the mobile terminal 100, the user can answer the incoming call through the wearable device. When a message is received by the mobile terminal 100, the user can check the received message through the wearable device.

Figure 3:
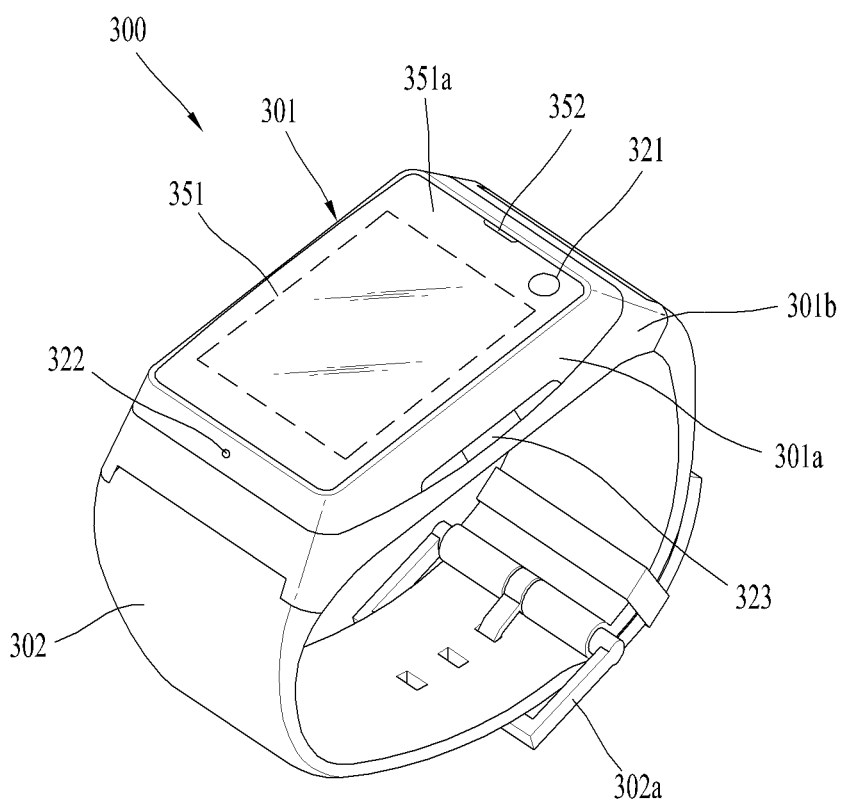
FIG. 3 is a perspective diagram for one example of a watch type mobile terminal related to another embodiment of the present invention.

FIG. 3 is a perspective diagram for one example of a watch type mobile terminal 300 related to another embodiment of the present invention.

Referring to FIG. 3, a mobile terminal 300 of a watch type may include a main body 301 having a display unit 351 and a band 302 connected to the main body 301 to be wearable on a wrist. In general, the mobile terminal 300 may be configured to include features that are the same or similar to those of the former mobile terminal 100 shown in FIGS. 1A to 1C.

The main body 301 may include a case forming a certain appearance or exterior. As illustrated, the case may include a $1^{st}$ case 301a and a $2^{nd}$ case 301b configured to cooperatively provide an inner space for accommodating various electronic components therein, by which the present invention is non-limited. For instance, a single case is configured to provide the inner space, thereby embodying the mobile terminal 300 of a uni-body type.

The watch type mobile terminal 300 is configured to perform wireless communication, and an antenna for the wireless communication can be installed in the main body 301. It is able to expand performance of the antenna using the case. For example, a case containing a conductive material is electrically connected to the antenna to extend a ground region or a radiation region.

The display unit 351 is disposed on the front side of the main body 301 so as to output information. The display unit 351 is provided with a touch sensor so as to be embodied into a touchscreen. As illustrated, a window 351a of the display unit 251 is mounted on the $1^{st}$ case 301a to form a front surface of the terminal body together with the $1^{st}$ case 301a.

The main body 301 may be provided with an audio output unit 352, a camera 321, a microphone 322, a user input unit 323 and the like. In case that the display unit 351 is embodiment into the touchscreen, it can function as a user input unit 323. Hence, a separate key may not be provided to the main body 301.

The band 302 is configured to be worn on a wrist by enclosing the wrist. And, the band 302 may be formed of a flexible material for facilitating the wearing of the device. As one example, the band 302 may be made of leather, rubber, silicon, synthetic resin, and/or the like. As the band 302 is configured detachable from the main body 301, the band 302 may be substituted with various types of bands according to a user's preference.

Meanwhile, the band 302 may be used to expand the performance of the antenna. For example, a ground extending portion (not shown in the drawing) for extending a ground region by being electrically connected to the antenna may be built in the band 302.

The band 302 may include a fastener 302a. The fastener 302a may be embodied into a buckle type, a snap-fit hook structure, a Velcro® type, and/or the like. The fastener 302a may include a retractile section or material. According to the example shown in the present drawing, the fastener 302a is embodied into the buckle type.

Figure 4:
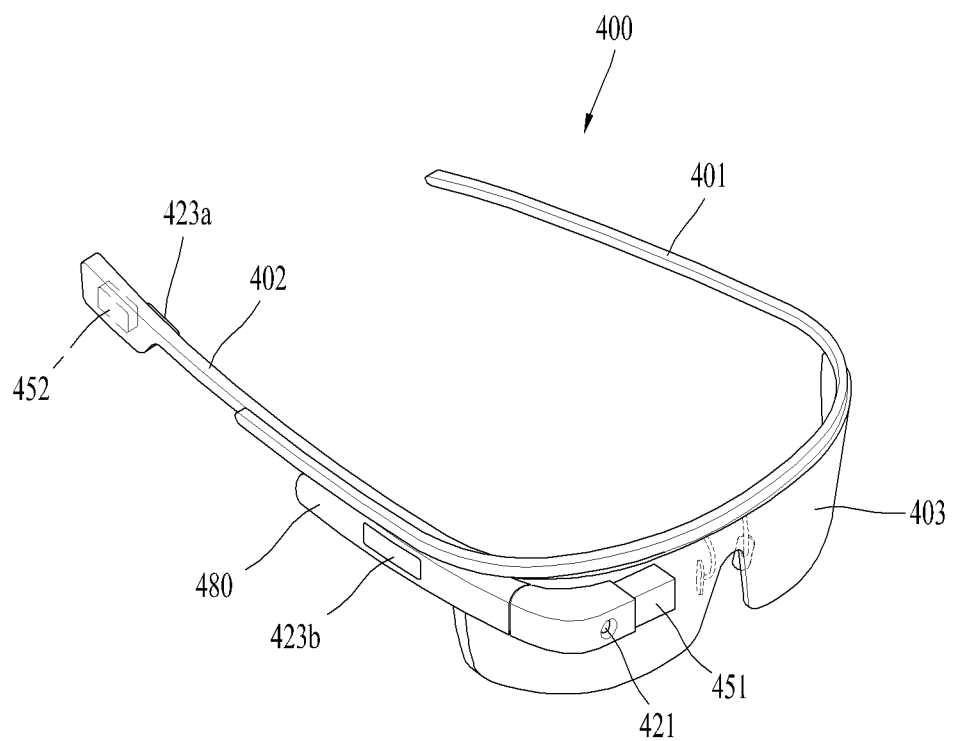
FIG. 4 is a perspective diagram for one example of a glass type mobile terminal related to further embodiment of the present invention.

FIG. 4 is a perspective diagram for one example of a glass type mobile terminal 400 related to further embodiment of the present invention.

The glass type mobile terminal 400 is configured wearable on a head of a human body. To this end, the glass type mobile terminal 400 may include a frame unit (e.g., a case, a housing, etc.). The frame unit may be formed of a flexible material to be easily wearable. According to the example shown in the drawing, the frame unit of the mobile terminal 400 includes a $1^{st}$ frame 401 and a $2^{nd}$ frame 402, each of which can be made of a different material. In general, the mobile terminal 400 may have the same or similar features of the former mobile terminal 100 shown in FIGS. 1A to 1C.

The frame unit may be supported by the head and provides a space for mounting various components therein. As illustrated, electronic components such as a control module 480, an audio output unit 452 and the like may be installed in the frame unit. And, a lens 403 configured to cover at least one of the left and the right eye may be detachably installed in the frame unit.

The control module 480 is configured to control various electronic components provided to the mobile terminal 400. It may be appreciated that the control module 480 has the configuration corresponding to the aforementioned controller 180. According to the example shown in the present drawing, the control module 480 is installed in the frame unit on one side of the head, by which a location of the control module 480 is non-limited.

The display unit 451 may be embodied into a head mounted display (HMD). The HMD refers to a display system for directly projecting an image in front of user's eyes in a manner of being mounted on the head. In order to provide an image directly in front of the user's eyes, when the user wears the glass type mobile terminal 400, the display unit 451 may be disposed to correspond to at least one of the left eye and the right eye. According to the example shown in the present drawing, the display unit 451 is situated at a location corresponding to the right eye in order to output an image toward the user's right eye.

The display unit 451 may project an image into the user's eye using a prism. And, the prism may be formed to be optically transparent so that the user can watch the projected image and a general visual field (i.e., a range viewed by a user through the corresponding eye) in front of the user.

Thus, the image outputted through the display unit 451 may be viewed in a manner of overlapping the general visual field. The mobile terminal 400 can provide AR (Augmented Reality) by overlaying a virtual image on a real image or a background using the property of the display.

The camera 421 may be disposed adjacent to at least one of the left eye and the right eye to photograph an image in front. Since the camera 421 is situated adjacent to the eye, the camera 421 can obtain an image of a scene currently viewed by the user.

According to the example shown in the preset drawing, the camera 421 is provided to the control module 480, by which the present invention is non-limited. Alternatively, the camera 421 may be installed in the frame unit. Alternatively, a plurality of cameras may be provided to obtain stereoscopic images.

The glass type mobile terminal 400 may include user input units 423a and 423b manipulated to receive an input of a control command. The user input units 423a and 423b may employ any manners (e.g., touch, push, etc.) corresponding to a tactile manner in which a user can perform manipulations by experiencing a tactile sense. According to the example shown in the present drawing, the user input units 423a and 423b of the push input manner and the touch input manner are provided to the frame unit and the control module 480, respectively.

Moreover, the mobile terminal 400 may further include a microphone (not shown in the drawing) for receiving an input of a sound and then processing the input sound into electric audio data and an audio output module 452 for outputting audio. The audio output module 452 may be configured to transfer audio in a general audio output manner or an osteoconductive manner. In case that the audio output unit 452 is embodied in the osteoconductive manner, when the user wears the mobile terminal 400, the audio output unit 452 comes in close contact with a user's head and vibrates user's skull to transfer audio.

Hereinafter, embodiments related to a control method that can be implemented in the mobile terminal configured as above will be described with reference to the accompanying drawings. It will be apparent to those skilled in the art that the present invention may be embodied in other specific forms without departing from the spirit or essential characteristics thereof.

In the following, embodiments of the present invention will be described by taking the mobile terminal 100 shown in FIG. 1A as an example of a mobile terminal. However, it goes without saying that the mobile terminal according to an embodiment of the present invention may be implemented by the mobile terminals 200, 300, and 400 shown in FIGS. 2-4.

Hereinafter, referring to FIGS. 5 to 18, it is assumed that the movement path of drone, moving velocity of drone, a mobile terminal for setting a mobile altitude and a control method thereof will be described in detail below. However, those skilled in the art will be able to perform supplemental analysis or embodiments according to FIGS. 5 to 18 below with reference to FIGS. 1 to 4. It is also possible to deform.

Figure 5:
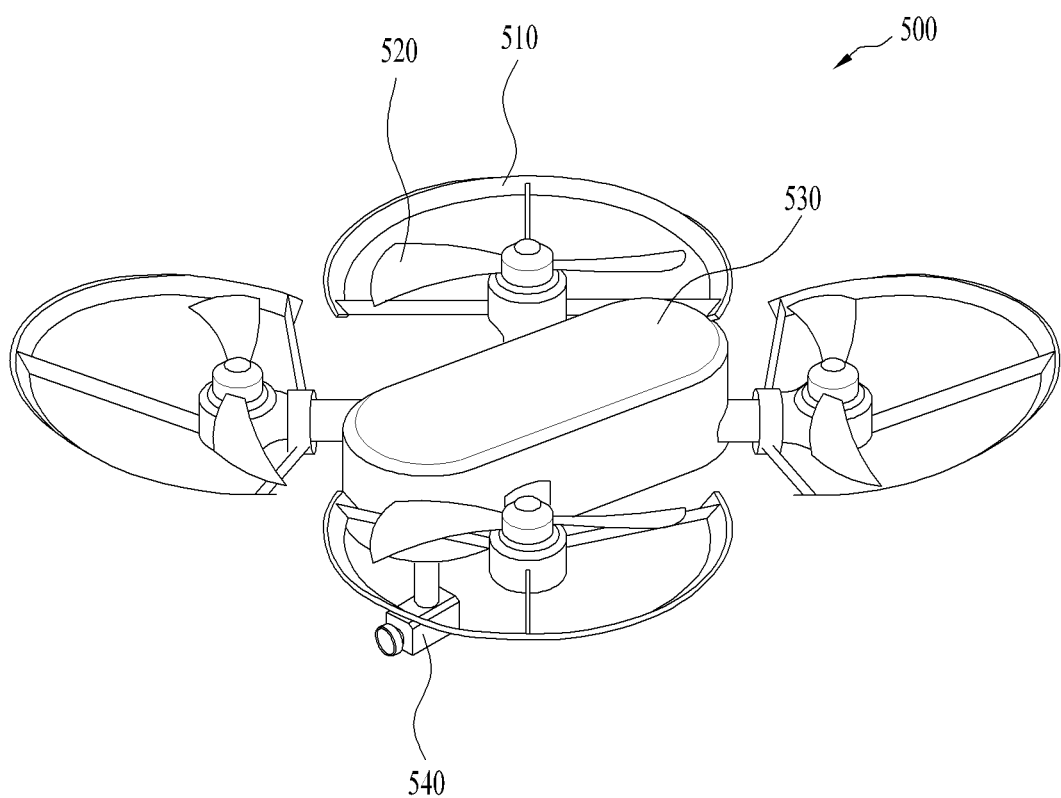
FIG. 5 is a diagram showing one example of an exterior of a drone controlled by a mobile terminal according to one embodiment of the present invention.

FIG. 5 is a diagram showing one example of an exterior of a drone controlled by a mobile terminal according to one embodiment of the present invention.

Referring to FIG. 5, a drone 500 may include a propeller guard 510, a propeller 520, a body 530, a camera 540, a battery, a control unit, a communication unit, a sensing unit and the like. And, the above configurations included in the drone 500 may be implemented with the description shown in FIG. 1A. Yet, the scope of the appended claims and their equivalents of the present invention may be non-limited by the configuration of the drone 500 shown in FIG. 5. In particular, the present invention is applicable to drones of various types including a helicopter type (e.g., a tricopter with 3 propellers, a quadcopter with 4 propellers shown in FIG. 5, an octacopter with 8 propellers, etc.), an airplane type and the like.

The propeller guard 510 is configured to prevent a human or animal from being hurt by an operation of the propeller 520 and may be omitted. The propeller 520 and the camera 540 operate in response to a control signal of the body 530. And, a wireless communication module configured to communicate with a mobile terminal is included in the body 530. According to an embodiment, it is able to control a motion of the camera 540 precisely using a separate control signal different from the control signal of the body 530.

The camera 540 obtains a still image or a video in accordance with a control signal of the control unit 550. The control signal of the control unit 550 for controlling the camera 540 may be based on a signal transmitted from the mobile terminal 100 through the communication unit 560. The camera 540 may be set stationary not to have any motion. Alternatively, the camera 540 may be designed to move at a prescribed angle in a plane formed by x-axis and y-axis (in addition, planes in parallel with the x-y plane are included) or a plane formed by z-axis (in addition, planes in parallel with the z-axis plane). According to an embodiment, the camera 540 may be controlled to face a direction different from a direction faced by the drone 500. For example, when the drone 500 makes a flight in a north direction with reference to a geomagnetic system, the camera 540 may face a direction other than the north. According to an embodiment, the camera 540 can be controlled by a camera control unit included in the control unit or a camera control unit configured separately from the control unit 550. Moreover, according to one embodiment of the present invention, the camera 540 may be controlled in response to a control signal of an external device.

The battery can supply power required for operations of the respective components of the drone 500. And, the battery can be designed chargeable.

The communication unit is designed to transmit and receive data through a wireless communication with the wireless communication unit 110 of the mobile terminal 100. In this case, the wireless communication unit 110 of the mobile terminal 100 may include at least one of the mobile communication module 112, the wireless internet module 113 and the short rage communication module 114. The communication unit can receive signals required for the control of the drone 500 from the mobile terminal 100 and is also able to transmit image data obtained through the camera 540 and sensing data sensed by the sensing unit 570 to the mobile terminal 100.

The sensing unit may include at least one sensor configured to sense location information of the drone 500. And, the sensing unit may include at least one sensor configured to sense state information of the drone 500, and more particularly, state information of the camera 540 included in the drone 500. For instance, the sate information of the camera 540 may include a direction information of the camera 540. According to an embodiment, the sensing unit may include at least one sensor configured to sense surrounding environment information around the drone 500. For instance, the sensing unit may include at least one of a GPS sensor, a geomagnetic sensor, an acceleration sensor, a magnetic sensor, a gravity sensor (G-sensor), a gyroscope sensor, a motion sensor, an altitude sensor, an atmospheric sensor, a temperature sensor, and the like. And, the sensing unit includes an ultrasonic sensor, an infrared sensor and the like, thereby preventing the drone 500 from colliding with an object near the drone 500.

The control unit can transmit the sensing data obtained by the sensing unit to the mobile terminal 100 through the communication unit. According to an embodiment, the controller may combine data sensed by at least two sensors included in the sensing unit together and may be then able to transmit the combined data to the mobile terminal 100 through the communication unit. And, the control unit plays a role in controlling operations of the respective components of the drone 500.

Figure 6:
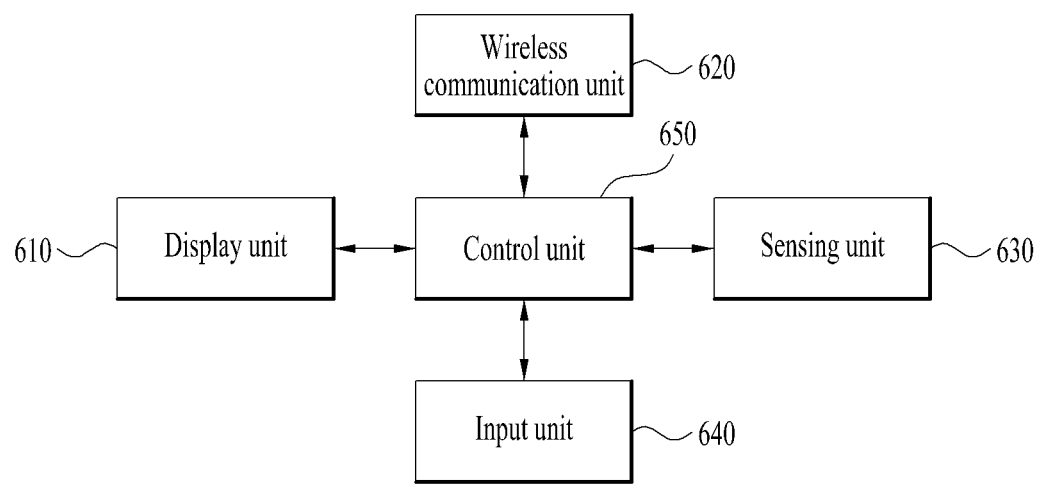
FIG. 6 is a block diagram to describe configuration modules of a mobile terminal according to one embodiment of the present invention.

FIG. 6 is a block diagram to describe configuration modules of a mobile terminal according to one embodiment of the present invention.

Referring to FIG. 6, a mobile terminal of the present invention may include a display unit 610, a wireless communication unit 620, a sensing unit 630, an input unit 640, a control unit 650 and the like. Moreover, in the following description, the display unit 610, the wireless communication unit 620, the sensing unit 630, the input unit 640 and the control unit 650 may be implemented according to the description with reference to FIG. 1A.

The display unit 610 may output visual information. Here, the visual information may include a content, an application, an image, a video and the like. The display unit 610 may output visual information to a screen based on a control command of the control unit 650. According to one embodiment of the present invention, the display unit 610 may output a map content in response to a command of the control unit 650.

The wireless communication unit 620 may transmit/receive data to/from a drone. The wireless communication unit may transmit a signal required for the control of the drone. According to one embodiment of the present invention, the wireless communication unit 629 may transmit a control signal, which is based on at least one of a set moving path, a set moving speed and a set moving altitude of the drone, to the drone in response to the command of the control unit 650.

The sensing unit 630 may sense a touch signal for the mobile terminal. The sensing unit 630 may detect a touch (or a touch input) applied to the sensing unit 630 using at least one of various types such as a resistance film type, an electrostatic capacity type and the like. The sensing unit 630 may be configured to convert a pressure applied to a specific portion of the sensing unit 630 or a change of capacitance generated from a specific portion into an electric input signal. Moreover, the sensing unit 630 may be implemented together with the display unit 610. According to one embodiment of the present invention, the sensing unit 610 can sense a touch signal of touching the display unit 610 with at least one of a specific pressure and a specific speed. Besides, an example of touching a mobile terminal with a specific pressure shall be described in detail with reference to FIG. 7.

The input unit 640 can receive inputs of various data such as numerical values, audio, image data, video data and the like. To receive inputs of data, the input unit 640 may include a camera, a microphone, a touch key, a hard key and the like. According to one embodiment of the present invention, the input unit 640 can receive an input of an altitude of a specific area on an outputted map content. An example of inputting an altitude of a specific area shall be described in detail with reference to FIG. 9.

The control unit 650 can process data, control the respective units of the above-described mobile terminal, and control data transmissions/receptions between the units. According to one embodiment of the present invention, while the map content is outputted to the display unit 610, the control unit 650 can sense a first touch signal of touching at least one partial area of the map content. Here, the first touch signal may correspond to a drag touch signal of moving along a first path at a first speed under a first pressure. The control unit 650 may set a moving path including a departure area and an arrival area based on the first path, set a moving sped of a drone based on the first speed, and set a moving altitude of the drone based on the first pressure. The control unit 650 may control a control signal, which is based on at least one of the set moving path, speed and altitude of the drone, to be transmitted to the drone through the wireless communication unit 620. According to one embodiment of the present invention, after sensing the first touch signal, the control unit 650 may sense a second touch signal of touching a first area on an outputted map content within a preset time. In response to the second touch signal, the control unit 650 may control a control signal, which enables a direction of a camera provided to the drone to photograph the first area, to be transmitted to the drone.

According to one embodiment of the present invention, operations performed by the mobile terminal can be controlled by the control unit 650. For clarity, such operations shall be commonly described as performed/controlled by the mobile terminal in the drawings and the following description.

The wireless communication unit 620, the sensing unit 630, the control unit 650 and the like, which are described in the following, are included in the mobile terminal described with reference to FIG. 6 and are different from the control unit, the communication unit, the sensing unit and the like described with reference to FIG. 5.

Figure 7:
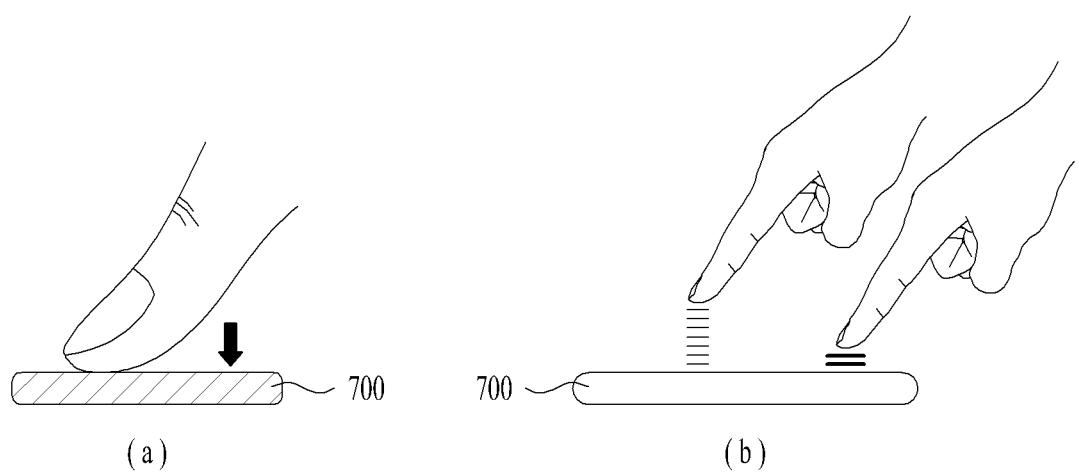
FIG. 7 is a diagram to describe an example of sensing a touch input according to another embodiment of the present invention.

FIG. 7 is a diagram to describe an example of sensing a touch input according to another embodiment of the present invention. Here, FIG. 7(a) is a diagram to describe an example of sensing a signal that touches a display unit 700 directly, and FIG. 7(b) is a diagram to describe an example of sensing a signal that touches a display unit 700 indirectly. Description redundant with that of FIG. 5 and FIG. 6 shall be omitted from the examples shown in FIG. 7.

Referring to FIG. 7(a), a mobile terminal may sense a first touch signal of directly touching a display unit 700 at a first pressure from a user. Here, the first touch signal may correspond to a direct touch signal sensed as a pointer comes in contact with the display unit 700 actually.

According to one embodiment of the present invention, the mobile terminal may set a moving altitude of a drone in response to a pressure sensed through the display unit 700. And, the mobile terminal may set a moving altitude of the drone in advance in response to a range of a sensed pressure.

Moreover, according to one embodiment of the present invention, the mobile terminal may set a moving altitude of a drone in response to a pressure strength of a touch signal according to a setting mode. Here, the setting mode may include a safety-preferred mode or an intuitiveness-preferred mode. One of the setting modes may be set as a default, or the setting modes may be manually set by a user.

For example, when a moving altitude setting mode of a drone in response to a pressure strength of a touch signal is a safety-preferred mode, if a pressure of a first touch signal increases gradually, the mobile terminal can set a moving altitude of the drone to be higher. In the safety-preferred mode, if the first touch signal is not sensed, the mobile terminal can transmit a landing control signal to the drone.

For another example, when a moving altitude setting mode of a drone in response to a pressure strength of a touch signal is a intuitiveness-preferred mode, if a pressure of a first touch signal decreases gradually, the mobile terminal can set a moving altitude of the drone to be higher. In the intuitiveness-preferred mode, if the first touch signal is sensed at a maximum pressure, the mobile terminal can transmit a landing control signal to the drone.

Referring to FIG. 7(b), the mobile terminal may sense a second touch signal of indirectly touching the display unit 700 at a second pressure from a user. Here, the second touch signal may correspond to an indirect touch signal sensed through a proximity sensor or the like while a pointer does not come in direct contact with the display unit 700.

Here, the proximity sensor can detect an indirect touch and an indirect touch pattern (e.g., an indirect touch distance, an indirect touch direction, an indirect touch speed, an indirect touch time, an indirect touch position, an indirect touch moving state, etc.). Moreover, the proximity sensor may detect a shape of an object located near a detection surface without being recognized as touching the display unit 700.

Moreover, a position on the display unit 700, at which an indirect touch signal is recognized from a pointer, may mean a position at which the pointer vertically opposes the display unit 700 when the pointer approaches the display unit 700.

According to one embodiment of the present invention, in response to a second touch signal sensed through the display unit 700, the mobile terminal may set a moving altitude of a drone. Particularly, the mobile terminal may set a moving altitude of a drone in response to a preset distance of a pointer located vertical to the display unit 700. Moreover, the mobile terminal may set a moving altitude of the drone in advance in response to a range of a sensed distance, For example, if a second touch signal vertically gets away from the display unit 700, the mobile terminal can set a moving altitude of the drone to be high. If a second touch signal vertically gets closer to the display unit 700, the mobile terminal can set a moving altitude of the drone to be low.

Thus, a user can intuitively set a moving altitude of a drone in a manner of touching a display unit of a mobile terminal directly or indirectly.

A mobile terminal for setting a moving altitude of a drone by the above-described method of FIG. 7 and control method thereof are described in the following.

Figure 8:
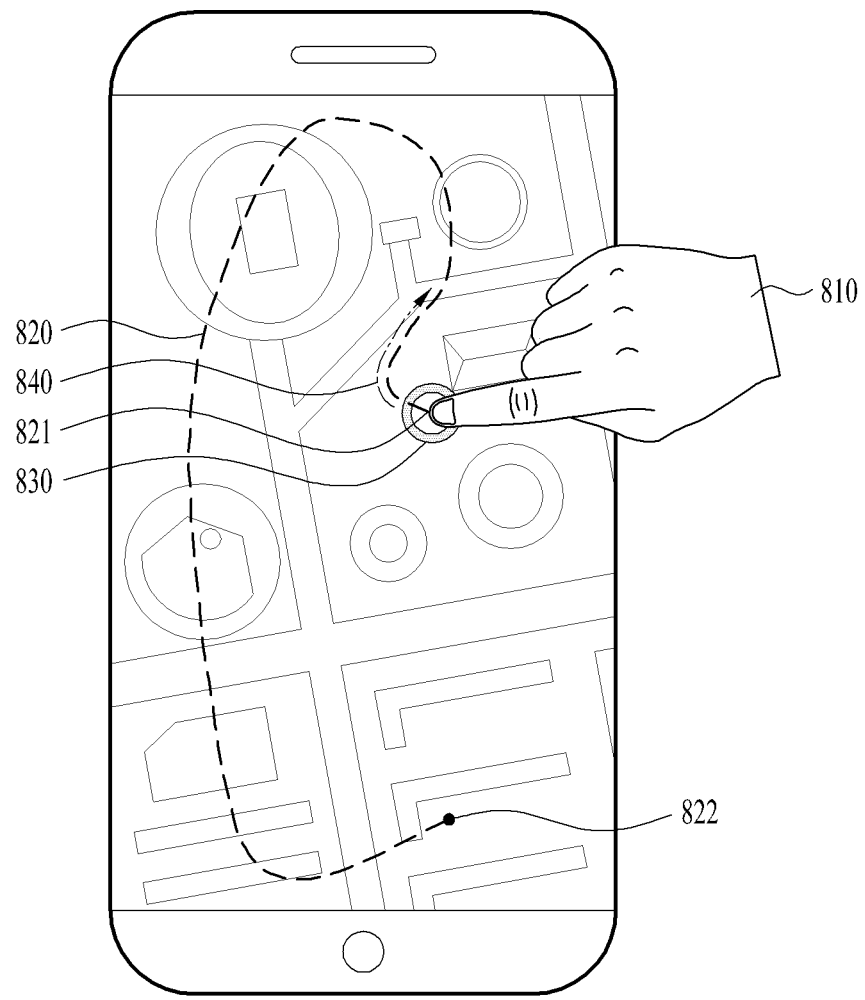
FIG. 8 is a diagram to describe an example of setting a moving path, a moving speed and a moving altitude of a drone in response to a first touch input according to one embodiment of the present invention.

FIG. 8 is a diagram to describe an example of setting a moving path, a moving speed and a moving altitude of a drone in response to a first touch input according to one embodiment of the present invention. Description redundant with that of FIGS. 5 to 7 shall be omitted from the example shown in FIG. 8.

Referring to FIG. 8, a mobile terminal can output a map content to a display unit. Here, the map content may correspond to an application for outputting satellite photos and the like. The map content may correspond to a content stored in the mobile terminal in advance. And, the map content may include a function for searching a flight area of a drone.

According to one embodiment of the present invention, the mobile terminal may sense a first touch signal 810 of touching at least one portion of the outputted map content. Here, the first touch signal 810 may correspond to a drag touch signal moving along a first path 820 at a first speed 840 and a first pressure 830. Here, the first path 820 may include at least one partial area of the outputted map content and correspond to a line including a departure point 821 and an arrival point 822. The first pressure 830 may correspond to at least one of a preset pressure sensed from the display unit described in FIG. 78 and a preset distance of a pointer located vertical to the display unit. And, the first speed 840 may correspond to a moving speed of the pointer for inputting the first touch signal 810.

According to one embodiment of the present invention, the mobile terminal may set a moving path including the departure point 821 and the arrival point 822 of the drone based on the first path 820. Hence, the drone can take off from the departure point 821, move along the set moving path, and then land at the arrival point 822, based on the first path 820.

A moving altitude of the drone can be set on the basis of the first pressure 830. An example of setting a moving altitude of the drone based on a pressure may refer to the former description of FIG. 7. For example, the mobile terminal may sort a strength range of a pressure of directly touching the display unit into 3 steps (e.g., first step moving altitude: 3 m, second step moving altitude: 5 m, third step moving altitude: 10 m). Thus, if a user applies a drag touch from a first point to a second point at a pressure of the second step, the mobile terminal can set the drone to fly at a height of 5 m from the first point to the second point. For another example, the mobile terminal may sort a distance range of a pressure of indirectly touching the display unit into 3 steps (e.g., first step moving altitude: 3 m, second step moving altitude: 5 m, third step moving altitude: 10 m). Thus, if a user applies a drag touch from a first point to a second point by being spaced apart from the display unit in a distance of the first step, the mobile terminal can set the drone to fly at a height of 3 m from the first point to the second point.

The mobile terminal may set a moving speed of the drone based on the first speed 840. According to one embodiment of the present invention, the mobile terminal can set the moving speed of the drone to be faster if the sensed first speed 840 becomes higher. For example, if a frag touch with a pointer is applied from a first point to a second point at the first speed 840, the mobile terminal can set the drone to move at the speed of 2 m/s from the first point to the second point. Here, the first point and the second point may be equal to or different from the departure point 821 and the arrival point 822. Namely, if a user applies a drag touch with a pointer at the same speed from the departure point 821 to the arrival point 822, the mobile terminal can set the drone to move at the same speed from the departure point 821 to the arrival point 822. On the other hand, the user may apply a drag touch to a predetermined area (e.g., second point to third point) at a second speed instead of the departure point 821 to the arrival point 822, and the mobile terminal may set the drone to move at the speed of 5 m/s from the second point to the third point. Namely, the second sped may be higher than the first speed 840.

According to one embodiment of the present invention, when the aforementioned moving path, speed and altitude of the drone are set, the mobile terminal is non-limited by the setting order thereof and may set at least one of them.

Besides, according to one embodiment of the present invention, the mobile terminal may control the wireless communication unit to transmit a control signal, which is based on at least one of the set moving path, speed and altitude of the drone, to the drone [not shown in the drawing]. And, the mobile terminal may transmit the control signal in response to a user' request.

Having received the control signal from the mobile terminal, the drone can make a path flight based on at least one of the set moving path, speed and altitude. According to one embodiment of the present invention, after taking off from the set departure point and then arriving at the arrival point, the drone can transmit a signal indicating that the drone has arrived at the arrival point to the mobile terminal. If receiving the signal indicating that the drone has arrived at the arrival point from the drone, the mobile terminal can transmit a signal for controlling the drone to return to the departure point, a signal for controlling the drone to stand y at the arrival point, or a signal for controlling the drone to land at the arrival point to the drone. If receiving the signal indicating that the drone has arrived at the arrival point from the drone, the mobile terminal can transmit a signal for controlling the drone to make a new path flight to the drone.

According to one embodiment of the present invention, the mobile terminal can save information on the set moving path, speed and altitude of the drone as data to the memory [not shown in the drawing]. Thus, the mobile terminal can retrieve a pre-saved moving path, speed and altitude of the drone by launching a map content and modify or transmit the preset moving path, speed and altitude of the drone to another external device. An example of modifying the preset moving path, speed and altitude of the drone shall be described in detail with reference to FIG. 14.

Thus, a user can input a moving path, speed and altitude of a drone at a time using a drag touch signal once.

Figure 9:
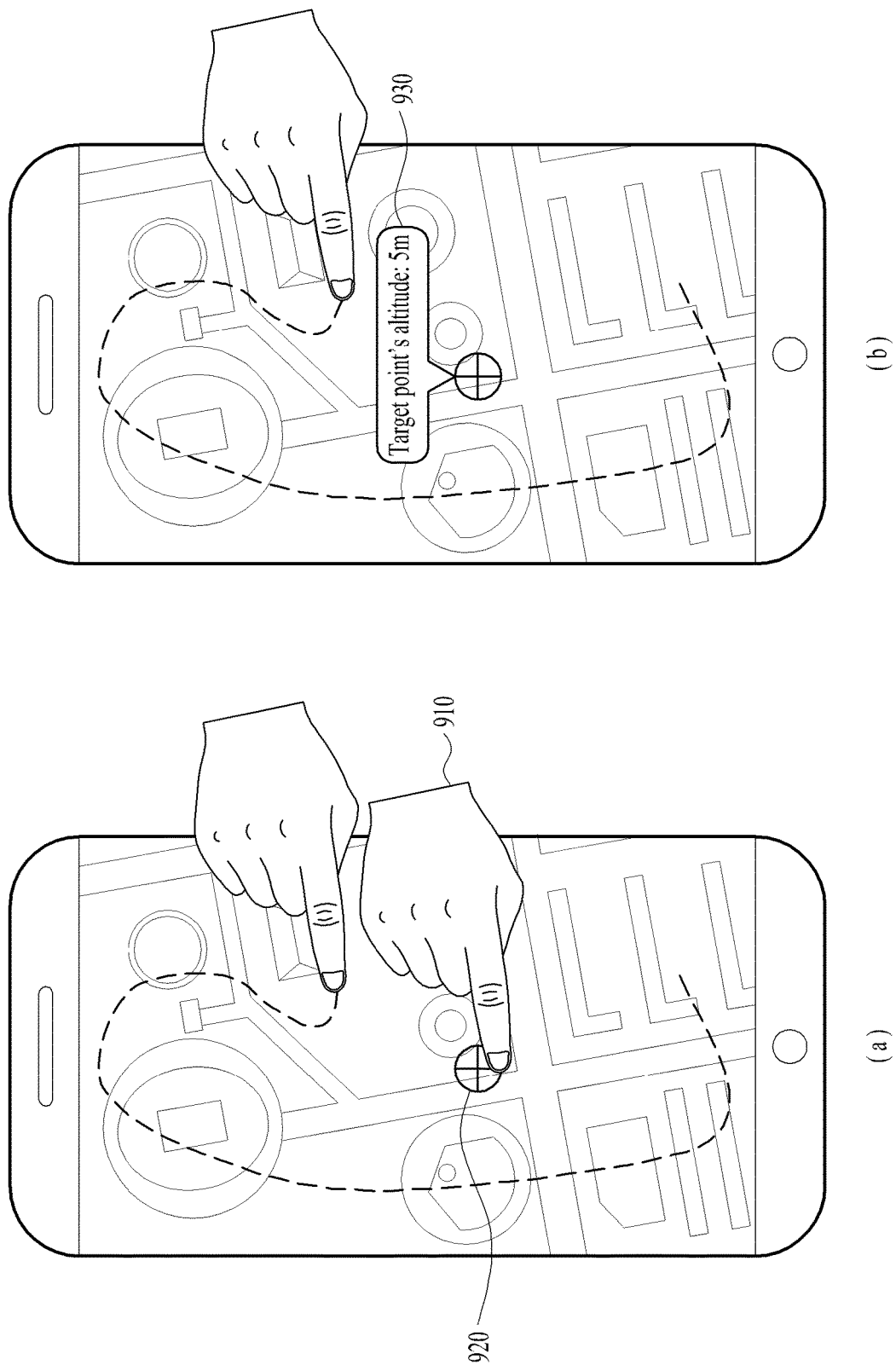
FIG. 9 is a diagram to describe an example of setting a camera direction of a drone in response to a second touch signal according to one embodiment of the present invention.

FIG. 9 is a diagram to describe an example of setting a camera direction of a drone in response to a second touch signal according to one embodiment of the present invention. Description redundant with that of FIGS. 5 to 8 shall be omitted from the example shown in FIG. 9.

Referring to FIG. 9(*a*), a mobile terminal may sense a second touch signal 910 of touching a first area 920 on an outputted map content within a preset time after sensing a first touch signal.

FIG. 9(*a*) is a diagram to describe an example that the mobile terminal senses the second touch signal 910 after sensing the first touch signal, in which the first touch signal and the second touch signal 910 may not be sensed simultaneously. Namely, after setting at least one of a moving path, speed and altitude of a drone through the first touch signal, a user can input the second touch signal 910.

According to one embodiment of the present invention, in response to the second touch signal 910, the mobile terminal may send the drone a signal for controlling a direction of a camera provided to the drone. Here, the direction of the drone may correspond to a direction for the camera to photograph the first area 920. Moreover, an altitude of the first area 920 can be assumed as located on the ground. This shall be described in detail with reference to FIG. 12. An example of directly receiving an input of an altitude of the first region 920 is described with reference to FIG. 9(*b*) as follows.

Referring to FIG. 9(*b*), in response to the second touch signal 910, the mobile terminal can control the drone to photograph the first area 920 using the camera provided to the drone. In FIG. 9(*b*), unlike the altitude of the first area 920 is assumed as located on the ground in FIG. 9(*a*), an altitude of the first area 920 can be directly inputted. Moreover, according to one embodiment of the present invention, the mobile terminal can output a popup window 930 for receiving a direct input of an altitude of the first area 920. For example, the mobile terminal can receive an input of an altitude '5 m' of the first area 920 through the popup window 930 from a user. In this case, the mobile terminal controls the drone in response to the drone's moving path, speed and altitude set according to the first touch signal and also controls the camera direction of the drone to photograph the first area 920. Namely, unlike the altitude of the first area 920 is assumed as located on the ground, if the altitude of the first area 920 is inputted as corresponding to 5 m, the mobile terminal can newly control the direction of the camera provided to the drone.

Moreover, after sensing the first touch signal and the second touch signal 920, the mobile terminal may control the wireless communication unit to transmit a control signal, which is based on the set moving path, speed and altitude of the drone and the camera direction, to the drone [not shown in the drawing]. Moreover, according to one embodiment of the present invention, while making a path flight based on the control signal, the drone may modify at least one of the moving path, the moving speed, the moving altitude and the camera direction by sensing a third touch signal. This shall be described in detail with reference to FIG. 14.

Accordingly, as a user can input a moving path, speed and altitude of a drone at a time using a first touch signal and also adjust a camera direction of the drone, thereby photographing an intended target easily and conveniently.

Figure 10:
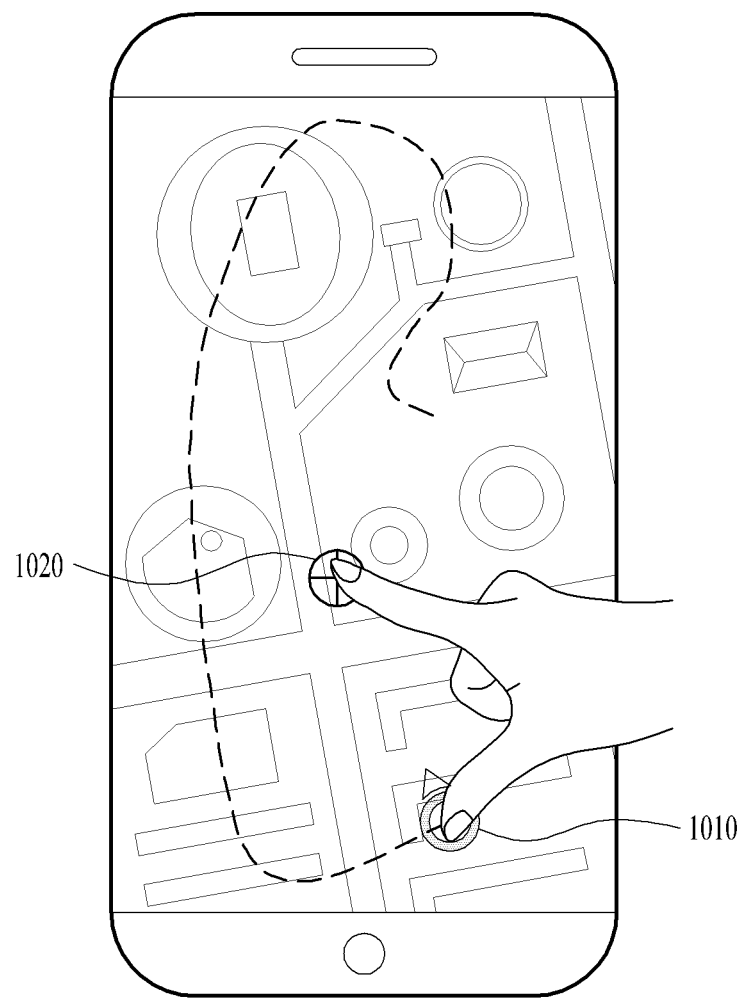
FIG. 10 is a flowchart to describe an example of simultaneously sensing a first touch signal and a second touch signal according to one embodiment of the present invention.

FIG. 10 is a flowchart to describe an example of simultaneously sensing a first touch signal and a second touch signal according to one embodiment of the present invention. Description redundant with that of FIGS. 5 to 9 shall be omitted from the example shown in FIG. 10.

Referring to FIG. 10, while a first touch signal 1010 is being sensed, a mobile terminal may sense a second touch signal 1020. Particularly, while the first touch signal 1010 for setting a moving path, speed and altitude of a drone is being sensed, the mobile terminal may sense the second touch signal 1020 for setting a camera direction of the drone.

For example, a user can input a first touch signal 1010 for setting a moving path, speed and altitude of the drone using a thumb. While the user is applying a drag touch to at least one partial area of a map content, the user may input a second touch signal 1020 of touching a first area on the map content using an index finger.

According to one embodiment of the present invention, the second touch signal 1020 can be sensed at any time if the first touch signal 1010 is being sensed. For example, while a user is applying a drag touch input to a departure point using a thumb, the user can directly input the second touch signal 1020. For another example, while a user is applying a drag touch to a moving path using a thumb, the user can input the second touch signal 1020 of touching the first area at a random point. In this case, in order to distinguish the first touch signal 1010 and the second touch signal 1020 from each other, the mobile terminal may recognize a signal of a touch applied for a shorter time as the second touch signal 1020.

Therefore, a user can adjust a moving path, a moving speed, a moving altitude and a camera direction of a drone using one hand.

Figure 11:
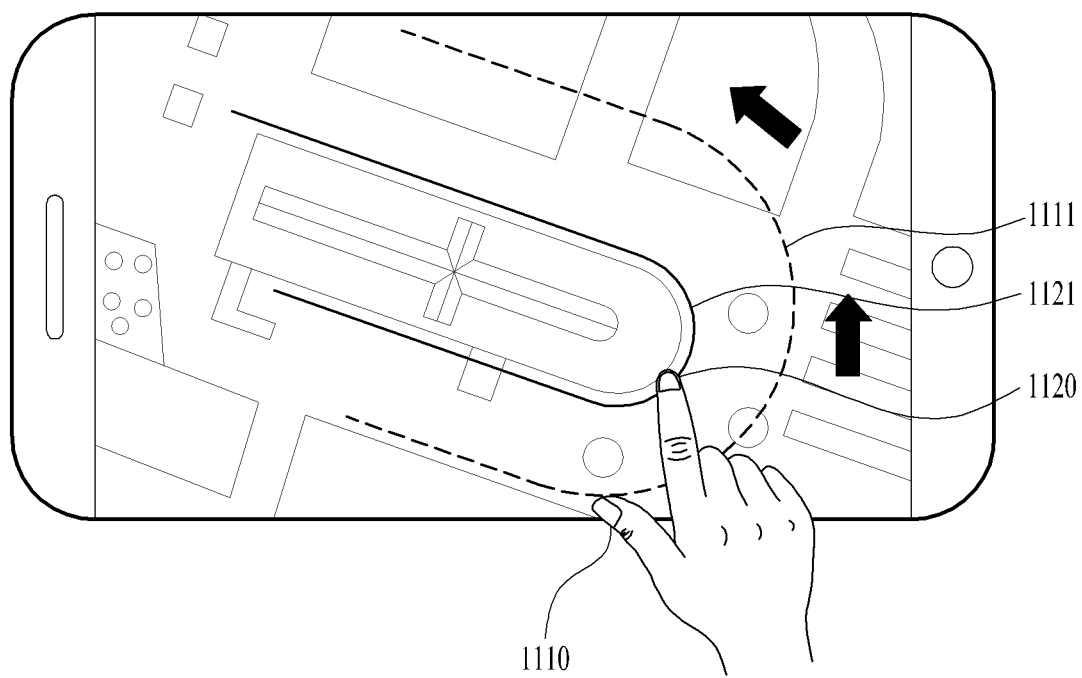
FIG. 11 is a diagram to describe an example that a first touch signal and a second touch signal simultaneously move according to one embodiment of the present invention.

FIG. 11 is a diagram to describe an example that a first touch signal and a second touch signal simultaneously move according to one embodiment of the present invention. Description redundant with that of FIGS. 5 to 10 shall be omitted from the example shown in FIG. 11.

Referring to FIG. 11, a mobile terminal can continuously sense a first touch signal 1110 and a second touch signal 1120 simultaneously. Here, the first touch signal 1110 and the second touch signal 1120 may correspond to drag touch signals different from each other, respectively. The second touch signal 1120 may include a drag touch signal having a path smaller than that of the first touch signal 1110.

According to one embodiment of the present invention, the mobile terminal may recognize the first touch signal 1110 and the second touch signal 1120 as a first path 1111 and a second path 1121, respectively. For example, a user can apply a drag touch input of the first path 1111 and a drag touch input of the second path 1121 using a thumb and an index finger, respectively. In order to distinguish the first touch signal 1110 and the second touch signal 1120 from each other, the mobile terminal may input a first-touched signal as the first touch signal 1110.

According to one embodiment of the present invention, the mobile terminal can set a moving path, speed and altitude of a drone based on the first touch signal 1110 and also set a camera direction of the drone based on the second touch signal 1120. Particularly, the drone can make a flight in the camera direction set in response to the second touch signal 1120 while flying along the moving path set in response to the first touch signal 1110 at the set moving speed and altitude. In doing so, as the second touch signal 1120 is changed continuously, the drone can continue to change the camera direction.

Therefore, a user can photograph an intended target in all directions using a drone.

Figure 12:
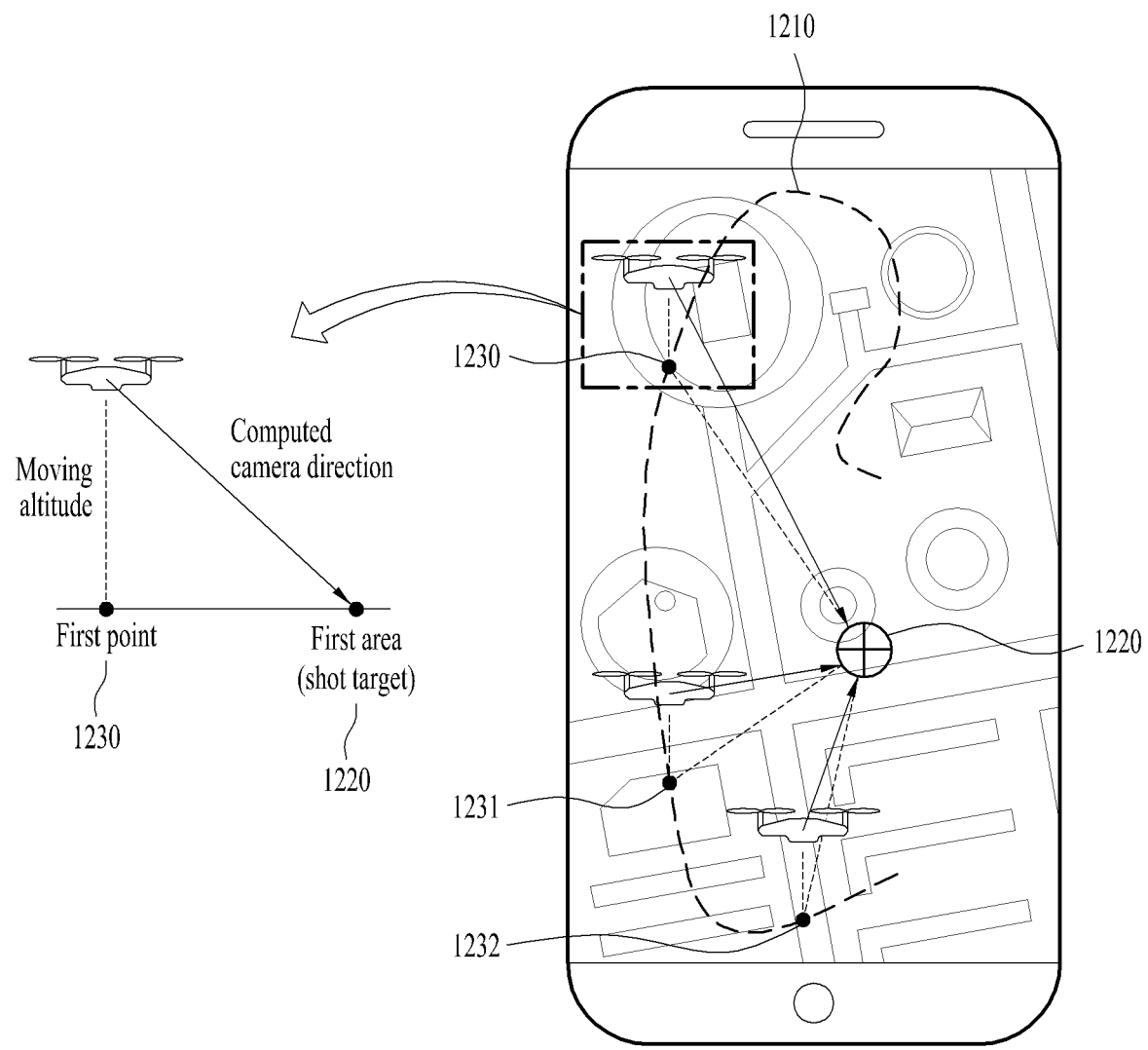
FIG. 12 is a diagram to describe an example that a drone photographs a first area according to one embodiment of the present invention.

FIG. 12 is a diagram to describe an example that a drone photographs a first area according to one embodiment of the present invention. Description redundant with that of FIGS. 5 to 11 shall be omitted from the example shown in FIG. 12.

Referring to a right diagram of FIG. 12, a drone can make a flight along a first path 1210 at a preset altitude and a preset speed in response to a control signal received from a mobile terminal. Here, the first path 1210 may correspond to a flight path preset in response to a first touch signal. The first path 1210 may correspond to a path via a first point 1230, a second point 1231 and a third point 1232. The first to third points 1230 to 1232 are provided to describe an example that a camera direction is changed. And, it is a matter of course that the first path 1210 passes through numerous random points.

According to one embodiment of the present invention, the drone can control a camera direction to photograph a first area 1220 in response to a control signal received from the mobile terminal. Here, the first area 1220 is assumed as located on the ground. Yet, as shown in FIG. 9(*b*), if an altitude of the first area 1220 is inputted, the mobile terminal can set the camera direction of the drone in consideration of the altitude of the first area 1220.

Particularly, referring to a left diagram of FIG. 12, a camera direction of the drone at the first point 1230 can be taken as an example. According to one embodiment of the present invention, the drone can set a camera direction to photograph the first area 1220 located on the ground at the first point 1230 having a preset altitude. Namely, the mobile terminal can set the camera direction of the drone based on a location (e.g., latitude and longitude of GPS coordinates) and altitude of the first point 1230 set from a first touch signal and an altitude of the first area 1220 set from a second touch signal.

Likewise, if the drone passes through the second point 1231 and the third point 1232, the mobile terminal can change the camera direction of the drone based on locations and altitudes of the second and third points 1231 and 1232 set from the first touch signal and the altitude of the first area 1220 set from the second touch signal.

Moreover, the mobile terminal can generate a signal of controlling the moving path, the moving speed, the moving altitude and the camera direction of the drone, which are set in response to the first and second touch signals, and transmit the signal to the drone automatically or in response to a user's request.

Therefore, while a drone is flying, a user can control a camera direction of the drone to be automatically adjusted toward a target to photograph without separate manual manipulations.

Figure 13:
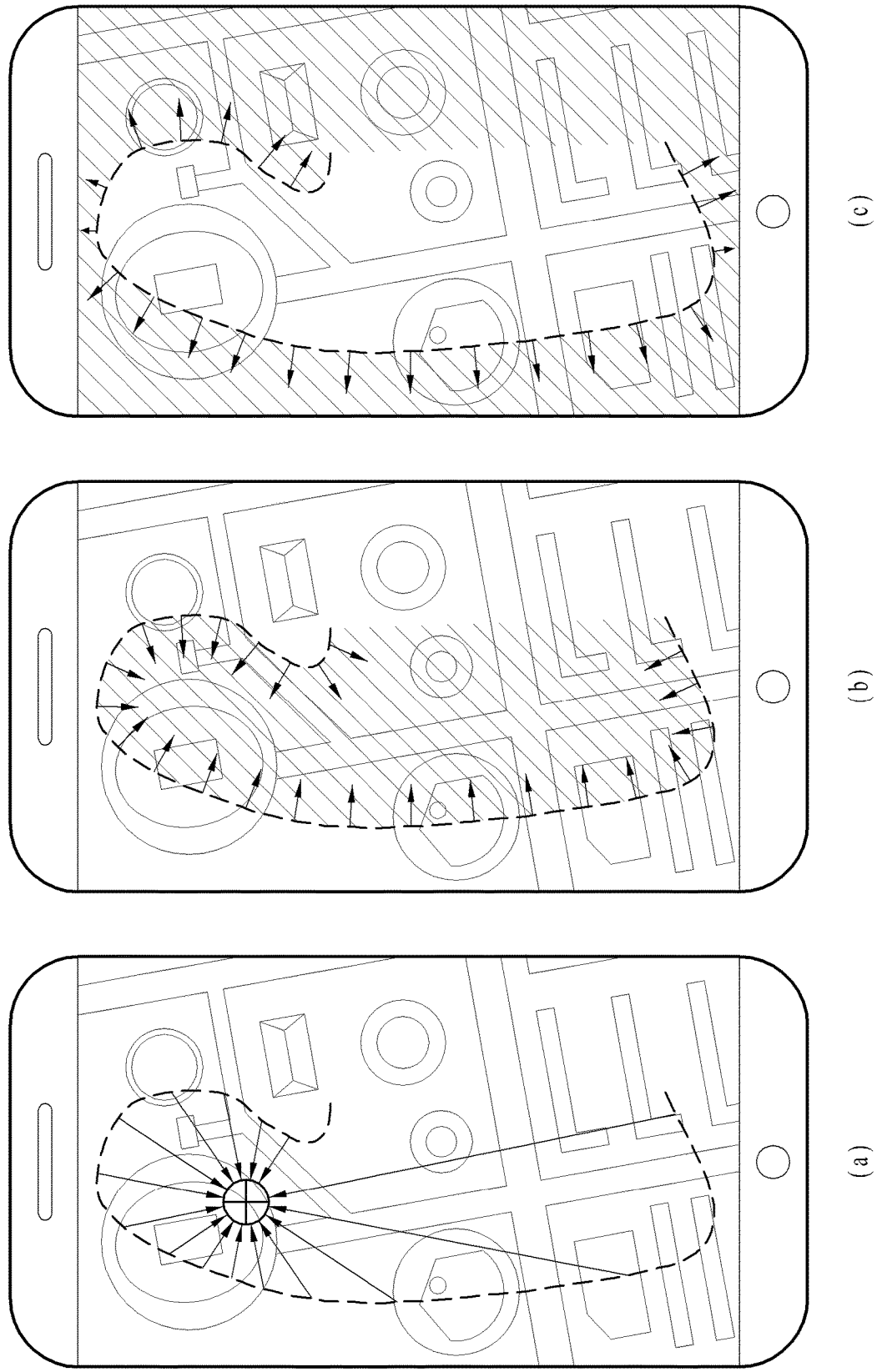
FIG. 13 is a diagram to describe an example of setting a camera direction mode of a drone according to one embodiment of the present invention.

FIG. 13 is a diagram to describe an example of setting a camera direction mode of a drone according to one embodiment of the present invention. Description redundant with that of FIGS. 5 to 12 shall be omitted from the example shown in FIG. 13.

According to one embodiment of the present invention, after a first signal has been sensed, if a second touch signal is not sensed for a preset time, a mobile terminal can automatically set a first area. Here, the first touch signal may correspond to a drag touch signal for setting at least one of a first path, a first pressure and a first altitude of an outputted map content, and the second touch signal may correspond to a signal of touching a first area of the outputted map content.

FIG. 13(*a*) is a diagram to describe an example that after a first touch signal has been sensed by a mobile terminal, a second touch signal is sensed within a preset time. FIG. 13(*b*) and FIG. 13(*c*) are diagrams to describe examples that after a first touch signal has been sensed by a mobile terminal, a second touch signal is not sensed for a preset time. Particularly, FIG. 13(*b*) is a diagram to describe an inside shot mode of a first path and FIG. 13(*c*) is a diagram to describe an outside shot mode of the first path.

Referring to FIG. 13(*a*), like the above-described FIG. 9(*a*) and FIG. 12, a mobile terminal may set a moving path, speed and altitude of a drone in response to a first touch signal and also set a camera direction of the drone to photograph a first area in response to a second touch signal. The second touch signal may correspond to a touch signal sensed while the first touch signal is sensed or a touch signal sensed within a preset time after sensing the first touch signal. According to one embodiment of the present invention, the mobile terminal can transmit a control signal, which is generated based on the set moving path, moving speed, moving altitude and camera direction of the drone, to the drone. Therefore, the drone can make a flight along a first path by changing the camera direction into an arrow direction shown in FIG. 13(*a*) in response to the received control signal.

Referring to FIG. 13(*b*), if the mobile terminal does not sense the second touch signal for a preset time after sensing the first touch signal, the mobile terminal can automatically set a first area. For example, the mobile terminal can set the first area as an inside area of the first path. Hence, the mobile terminal can set the camera direction of the drone to photograph an inside area of the first path and transmit a control signal, which is based on the set camera direction, to the drone. Considering the example of FIG. 13(*b*), the drone can make a flight along the first path while shooting a right area of the first path. Such a case is called an inside shot mode.

Referring to FIG. 13(*c*), if the mobile terminal does not sense the second touch signal for a preset time after sensing the first touch signal, the mobile terminal can automatically set a first area. For example, the mobile terminal can set the first area as an outside area of the first path. Hence, the mobile terminal can set the camera direction of the drone to photograph an outside area of the first path and transmit a control signal, which is based on the set camera direction, to the drone. Considering the example of FIG. 13(*b*), the drone can make a flight along the first path while shooting a left area of the first path. Such a case is called an outside shot mode.

Figure 14:
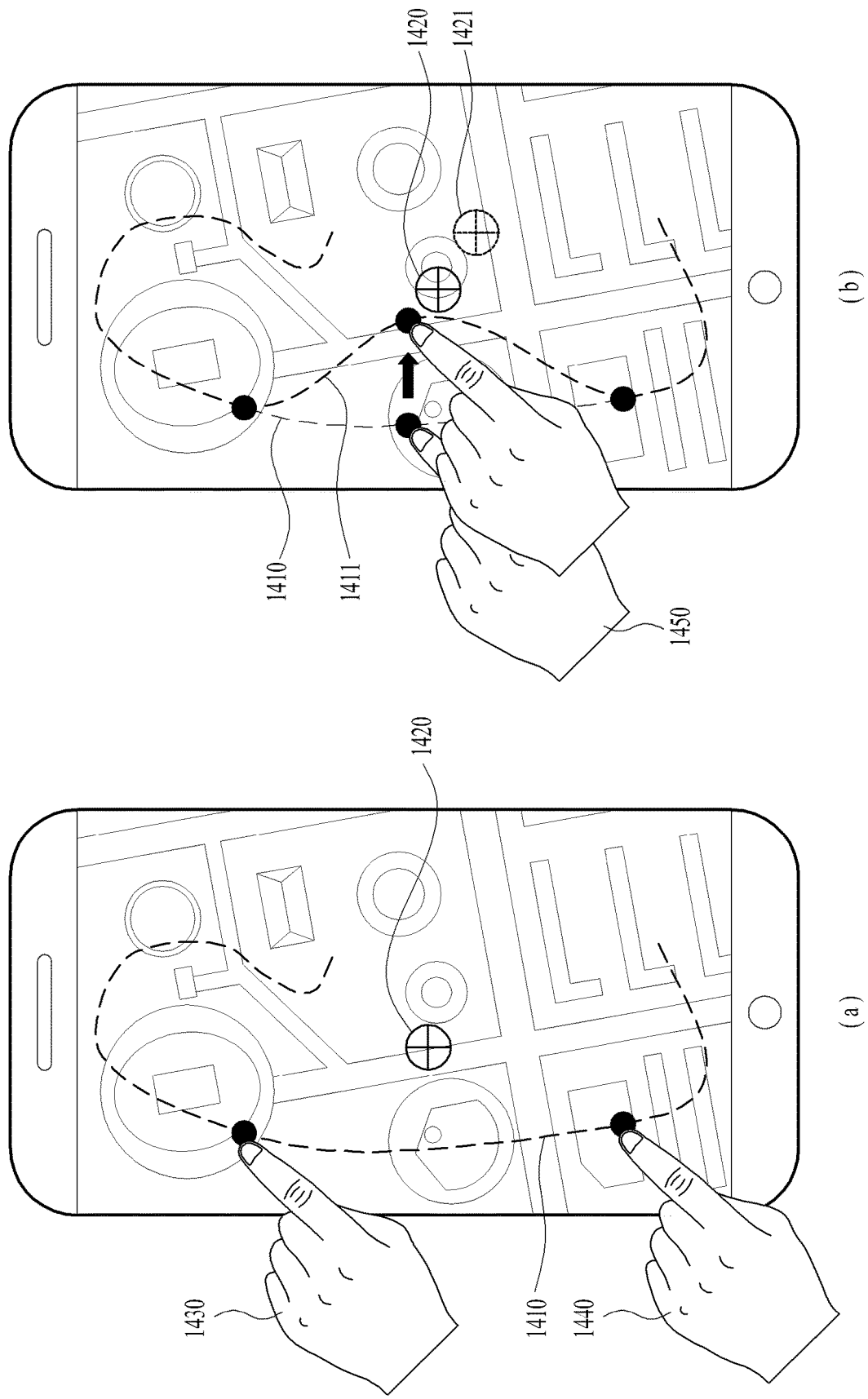
FIG. 14 is a diagram to describe an example of modifying at least one of a moving path, a moving speed, a moving altitude and a target point of a drone according to one embodiment of the present invention.

In the mobile terminal, one of the inside shot mode and the outside shot mode can be set as a default mode. Hence, although a user does not input a second input signal for a preset time after inputting a first touch single, the mobile terminal can set the camera direction of the drone based on the automatically set inside or outside shooting mode FIG. 14 is a diagram to describe an example of modifying at least one of a moving path, a moving speed, a moving altitude and a target point of a drone according to one embodiment of the present invention. Description redundant with that of FIGS. 5 to 13 shall be omitted from the example shown in FIG. 14.

FIG. 14(a) and FIG. 14(b) are diagrams to describe an example of modifying a set moving path, a set moving speed, a set moving altitude and a set target point of a drone. Here, the target point may include a point a camera of the drone intends to photograph.

According to one embodiment of the present invention, in order to modify a moving path, a moving speed, a moving altitude and a target point of a drone, information on a moving path, a moving speed, a moving altitude and a target point, which are set in advance, of the drone can be stored in a mobile terminal in advance. Hence, the mobile terminal can retrieve the stored information and then modify it on a map content.

According to one embodiment of the present invention, before or after transmitting a control signal based on information set for the drone, the mobile terminal can modify a moving path, a moving speed, a moving altitude and a target point of the drone as well. After the drone has started to make a path flight along a set path, it is a matter of course that the mobile terminal can modify a moving path, a moving speed, a moving altitude and a target point of the drone.

In the following, an example of modifying a first path 1610 through a first touch signal is described. Yet, it is a matter of course that the mobile terminal can modify at least one of a first pressure, a first speed and a first area as well as the first path 1610. Here, the first path 1610, the first pressure, the first speed and the first area may correspond to a moving path of the drone, a moving altitude of the drone, a moving speed of the drone and a target point a camera of the drone attempts to photograph, respectively.

Referring to FIG. 14(a), the mobile terminal can set the drone to make a flight along the first path 1610. In this case, the mobile terminal may automatically set a camera direction of the drone to face a first area 1620 based on a first touch signal. According to one embodiment of the present invention, the mobile terminal may sense a second touch signal 1639 of touching a start point for modifying the first path 1610 and a third touch signal 1640 of touching an end point therefor.

Referring to FIG. 14(b), after sensing the start and end points for modifying the first path 1610, the mobile terminal may sense a fourth touch signal 1650. Here, the fourth touch signal 1650 may correspond to a drag touch signal for modifying the first path 1610 into a second path 1611. For example, a user may touch a middle point between the start and end points of the first path 1610 to modify and then apply a drag touch to the right by a predetermined range. According to one embodiment of the present invention, if sensing the fourth touch signal 1650, the mobile terminal can modify the moving path of the drone into the second path 1611 from the first path 1610. According to one embodiment of the present invention, the mobile terminal can modify the first area 1620 set on the basis of the first touch signal into a second area 1621 based on the second path 1611.

Moreover, as the first path 1610 is modified into the second path 1611, the mobile terminal may modify the first pressure, the first speed and the first area based on the second path 1611 [not shown in the drawing].

Accordingly, after setting a moving path, a moving speed, a moving altitude and a camera direction of a drone, a user can modify control information of the drone if the drone takes off or not. The user may save the set control information of the drone to the mobile terminal or modify a predetermined region only by retrieving pre-stored information.

Figure 15:
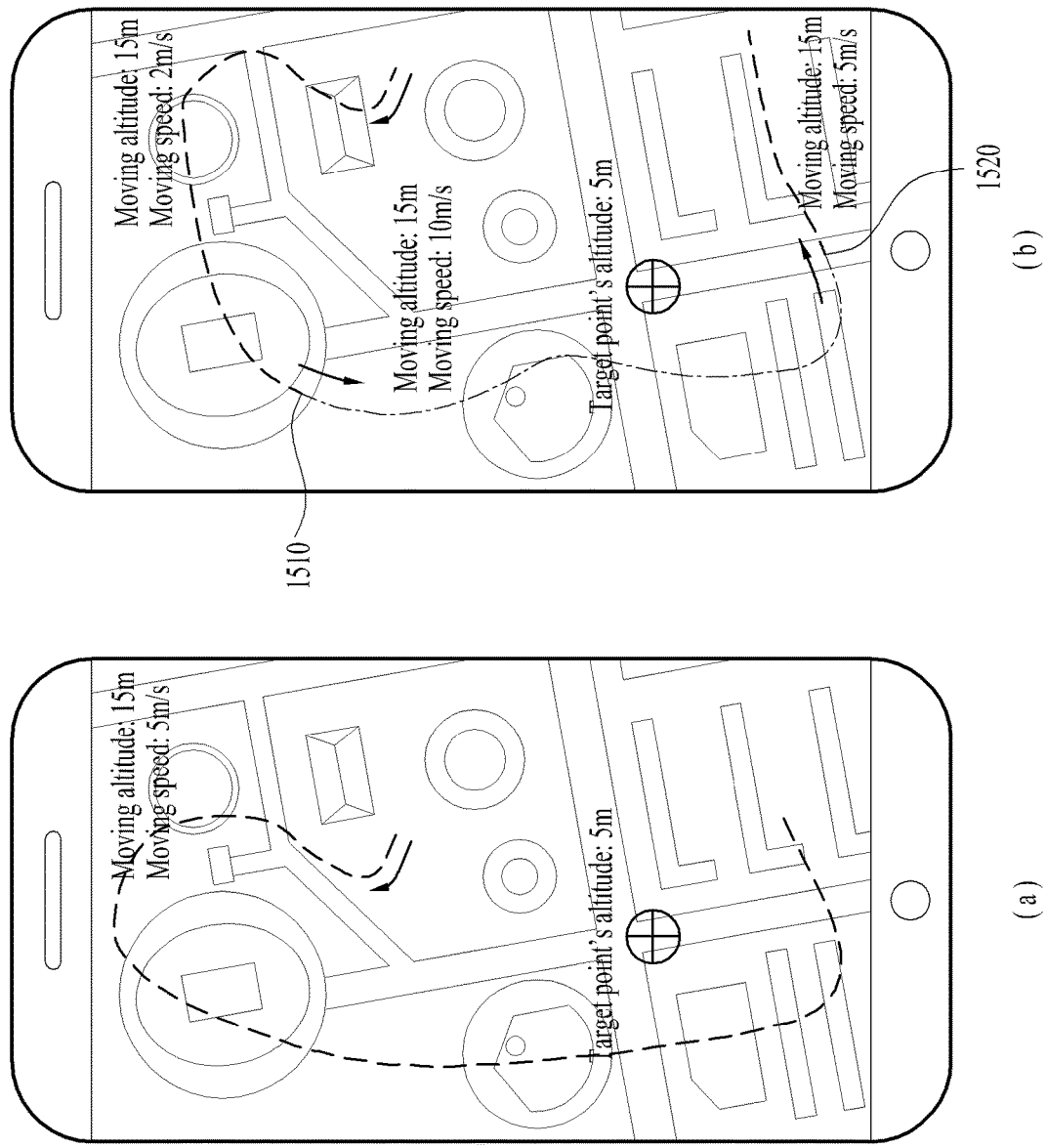
FIG. 15 is a diagram to describe an example of outputting an indicator indicating at least one of a moving path, a moving speed, a moving altitude and a target point on a map content according to one embodiment of the present invention.

FIG. 15 is a diagram to describe an example of outputting an indicator indicating at least one of a moving path, a moving speed, a moving altitude and a target point on a map content according to one embodiment of the present invention. Description redundant with that of FIGS. 5 to 14 shall be omitted from the example shown in FIG. 15.

Referring to FIG. 15(a), a mobile terminal can output an indicator, which indicates a set moving path, a set moving speed, a set moving altitude and a set target point of a drone, to an outputted map content. For example, the mobile terminal may output a dotted-line indicator that indicates a moving path of the drone to the map content and also output 15 m corresponding to a moving altitude of the drone, 5 m/s corresponding to a moving speed of the drone and 5 m corresponding to an altitude of a target point in a direction a camera of the drone attempts to photograph.

FIG. 15(b) is a diagram to describe an example that a moving speed differs in each predetermined area within a moving path of the drone. Yet, although FIG. 15(b) takes an example that a moving speed differs in each predetermined area, an example that a moving altitude differs in each predetermined area is applicable as well.

Referring to FIG. 15(b), the mobile terminal can set a moving speed and altitude of the drone, which are maintained from a take-off point of the drone to an arrival at a first point 1510, to 2 m/s and 15 m, respectively. And, the mobile terminal can set a moving speed and altitude of the drone, which are maintained from the first point 1510 to an arrival at a second point 1520, to 10 m/s and 15 m, respectively. Moreover, the mobile terminal can set a moving speed and altitude of the drone, which are maintained from the second point 1520 to a landing point of the drone, to 5 m/s and 15 m, respectively.

According to one embodiment of the present invention, the mobile terminal can output an indicator based on a moving speed and altitude of the drone. The mobile terminal can adjust a dotted line space of a path displayed on a map content according to the moving speed of the drone. For example, if the moving speed of the drone gets faster, the dotted line space of the path displayed on the map content can be outputted more thickly. Moreover, the mobile terminal can adjust a color of a path displayed on a map content according to a moving altitude of the drone [not shown in the drawing]. For example, if the moving altitude of the drone is high, the mobile terminal can output the path in red. If the moving altitude of the drone is low, the mobile terminal can output the path in blue.

Figure 16:
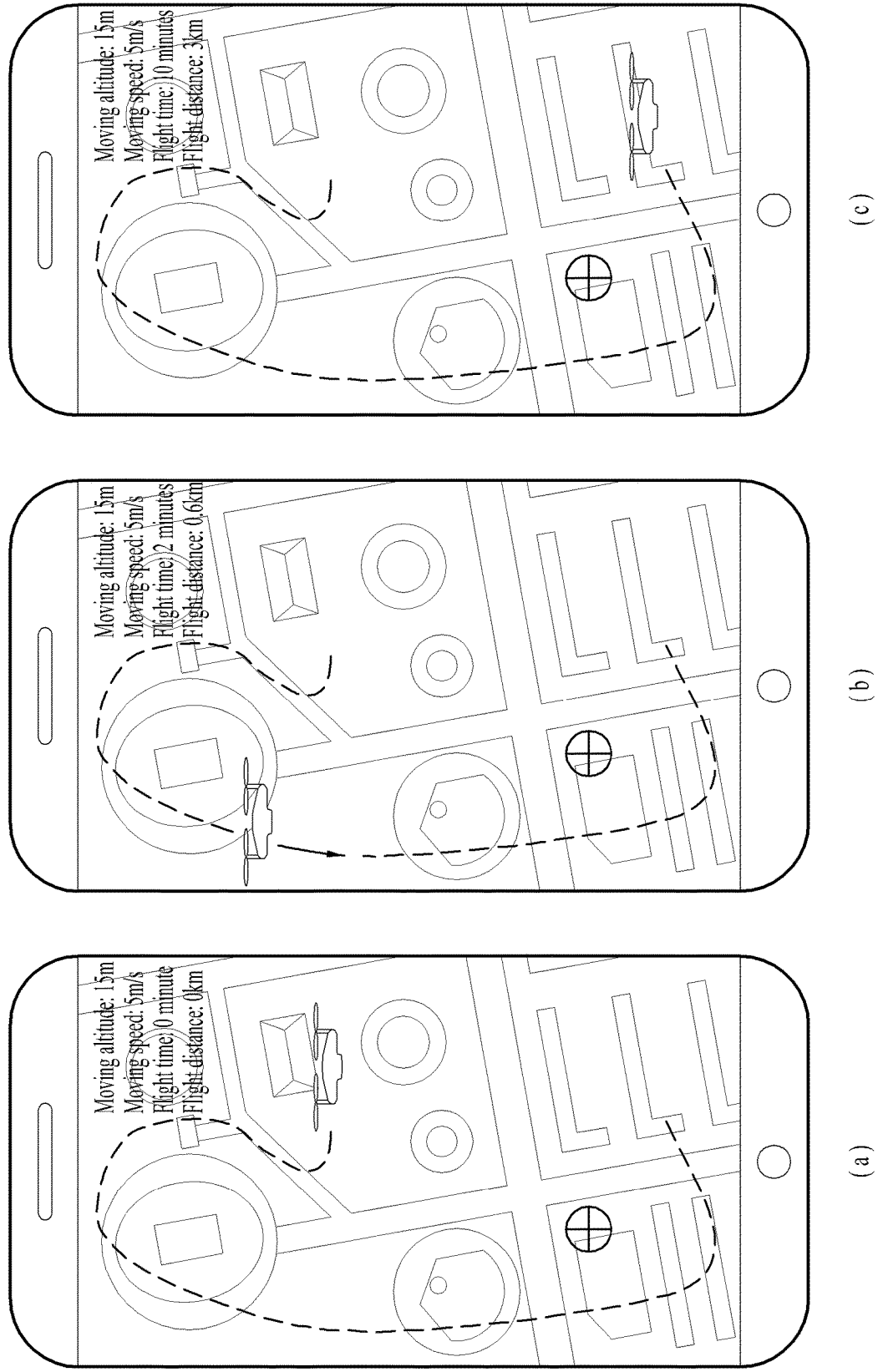
FIG. 16 is a diagram to describe a process for a drone to take off and land according to one embodiment of the present invention.

FIG. 16 is a diagram to describe a process for a drone to take off and land according to one embodiment of the present invention. Description redundant with that of FIGS. 5 to 15 shall be omitted from the example shown in FIG. 16.

According to one embodiment of the present invention, a mobile terminal can output an icon of a drone that makes a flight along a moving path until landing since taking off on a map content to which a moving path, a moving speed, a moving altitude and a target point of the drone are outputted.

FIG. 16(a) is a diagram showing a take-off timing of a drone, FIG. 16(b) is a diagram showing a flight process of the drone, and FIG. 16(c) is a diagram showing a landing timing of the drone.

According to one embodiment of the present invention, a mobile terminal can measure a flight time and distance since take-off and then output them as an indicator. Referring to FIG. 16(a), for example, at a timing point that the drone takes off, the mobile terminal can output a numerical indicator, which indicates a flight time '0 minute', a flight distance '0 km', and a flight distance '3 km', to a map content.

Accordingly, a user can obtain a current location of a drone flying along a preset moving path through a map content and also obtain a flight time and distance between a take-off timing and a landing timing.

Figure 17:
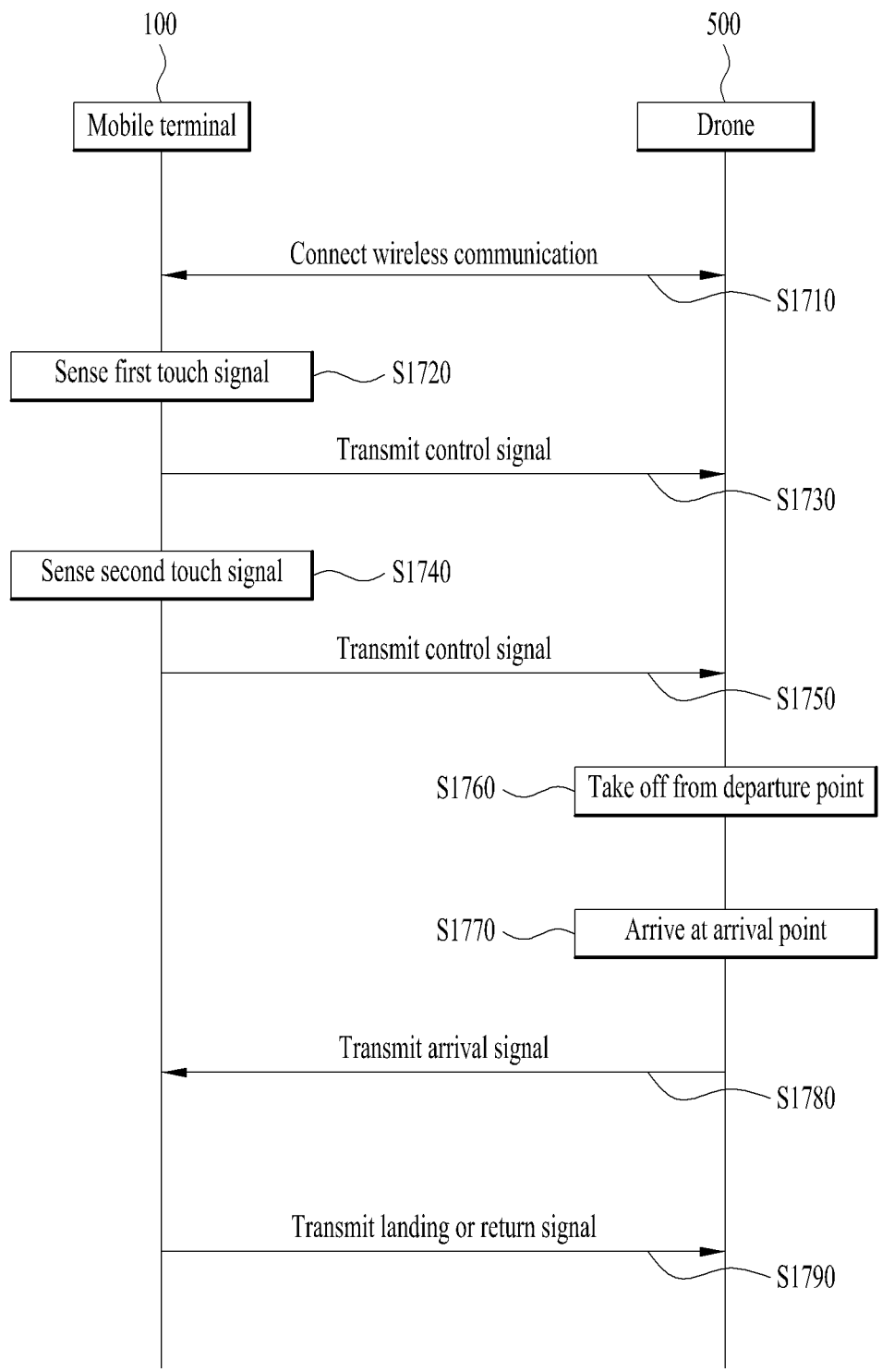
FIG. 17 is a diagram to describe an example of transceiving controls signals of a mobile terminal and a drone according to one embodiment of the present invention.

FIG. 17 is a diagram to describe an example of transceiving controls signals of a mobile terminal and a drone according to one embodiment of the present invention. Description redundant with that of FIGS. 5 to 16 shall be omitted from the example shown in FIG. 17.

Referring to FIG. 17, in a step S1710, wireless communication can be established between a mobile terminal 100 and a drone 500. Here, the wireless communication can be enabled by at least one of a broadcast receiving module 111, a mobile communication module 112, a wireless internet module 113 and a short-range communication module 114, which are included in each of the mobile terminal 100 and the drone 500. Thereafter, the mobile terminal may launch a map content [not shown in the drawing]. The map content may be launched before or after the mobile terminal 100 and the drone 500 are connected to each other by wireless communication.

In a step S1720, the mobile terminal 100 may sense a first touch signal from a user. Here, the first touch signal may correspond to a drag touch signal of moving on a partial area of the map content along a first path at a first pressure and a first speed. Here, the first path may correspond to a line including a departure point and an arrival point as at least one partial area of the outputted map content. The first pressure may correspond to at least one of a preset pressure sensed from a display unit and a preset distance of a pointer located vertical to the display unit. And, the first speed may correspond to a moving speed of a pointer for inputting a first touch signal.

In a step S1730, the mobile terminal 100 can transmit a control signal based on the first touch signal to the drone 500 through a wireless communication unit. According to one embodiment of the present invention, if receiving the control signal based on the first touch signal, the drone 500 can make a path flight along a moving path based on the first path at a moving altitude based on the first pressure and a moving speed based on the first speed.

In a step S1740, the mobile terminal 100 can sense a second touch signal from the user. Here, the second touch signal may correspond to an input signal of touching a first area on the map content. According to one embodiment of the present invention, the second touch signal may be sensed in a state that the first touch signal continues to be sensed or within a preset time after sensing the first touch signal. As the mobile terminal 100 senses the second touch signal, it is able to set a camera direction so as to enable a camera of the drone 500 to photograph the first area.

In a step S1750, the mobile terminal 100 may transmit a control signal based on the second touch signal to the drone 500. According to one embodiment of the present invention, if receiving the control signal based on the second touch signal, the drone 500 can control the camera direction so as to photograph the first area.

In a step S1760, based on the received control signal, the drone 500 can take off from a departure point. According to one embodiment of the present invention, after sensing the first touch signal, the drone 500 can receive a control signal from the mobile terminal 100 despite not sensing the second touch signal. In this case, the drone 500 can make a path flight in response to the control signal that is based on the first touch signal only. Moreover, after sensing both of the first and second touch signals, the drone 500 may receive a control signal from the mobile terminal 100. In this case, it is a matter of course that the drone 500 can make a path flight in response to the control signal that is based on both of the first and second touch signals.

In a step S1770, based on the received control signal, the drone 500 can arrive at an arrival point.

In a step S1780, the drone 500 can send the mobile terminal 100 a signal indicating that the drone 500 has arrived at the arrival point.

In a step S1790, if the signal indicating that the drone 500 has arrived at the arrival point is received from the drone 500, the mobile terminal 100 can send the drone 500 a landing signal, a standby signal or a return signal.

Figure 18:
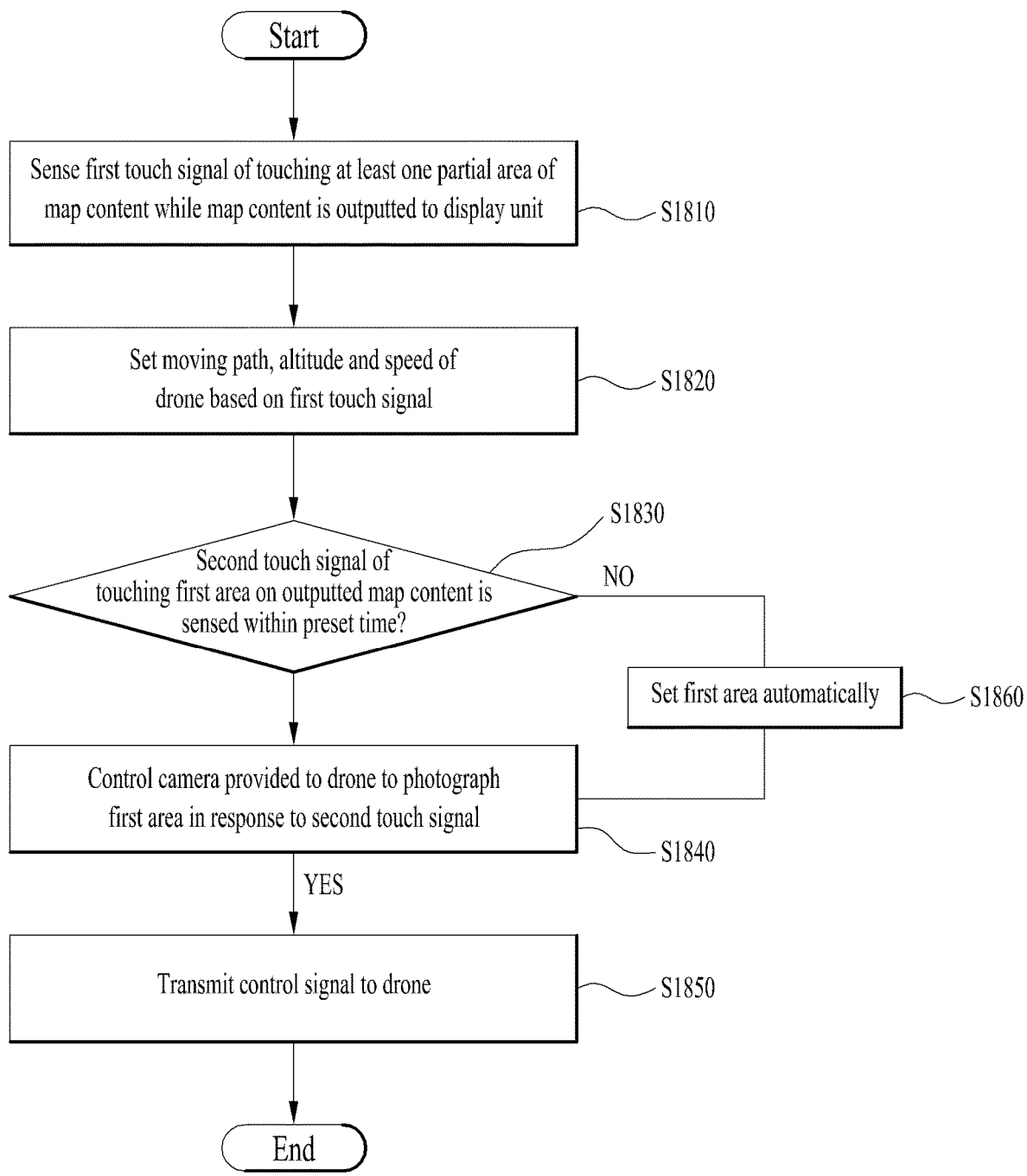
FIG. 18 is a flowchart to describe a method of controlling at least one of a moving path, a moving speed and a moving altitude of a drone according to one embodiment of the present invention.

FIG. 18 is a flowchart to describe a method of controlling at least one of a moving path, a moving speed and a moving altitude of a drone according to one embodiment of the present invention. The respective steps shown in FIG. 18 can be controlled by the controller 180 of the mobile terminal shown in FIG. 1A. Description redundant with that of FIGS. 5 to 17 shall be omitted from the example shown in FIG. 18.

Referring to FIG. 18, in a step S1810, while a map content is outputted to a display unit, a mobile terminal can sense a first touch signal of touching at least one partial area of the map content.

In a step S1820, the mobile terminal can set a moving path, speed and altitude of a drone based on the first touch signal.

In a step S1830, after sensing the first touch signal, the mobile terminal can determine whether to sense a second touch signal of touching a first area on an outputted map content within a preset time.

If the second touch signal is sensed within the preset time, in a step S1840, the mobile terminal can control a direction of a camera provided to the drone in response to the second touch signal so that the camera can photograph the first area.

In a step S1850, the mobile terminal can send the drone a signal for controlling the set moving path, moving speed, moving altitude and camera direction of the drone.

If the second touch signal is not sensed within the preset time, in a step S1860, the mobile terminal can automatically set a first area. In doing so, the mobile terminal can set an inside shot mode or an outside shot mode as a default value. Moreover, after the mobile terminal has set the first area automatically, the step S1850 may be executed.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

INDUSTRIAL APPLICABILITY

The present invention has industrial applicability in a mobile terminal and is applicable repeatedly.

What is claimed is:

1. A mobile terminal, comprising:
a display unit;
a transceiver configured to perform wireless communication with a drone;
a sensing unit;
an input unit; and
a controller configured to sense a first touch signal of touching at least one partial area of map content displayed by the display unit, the first touch signal including a drag touch signal of moving along a first path with a first pressure and a first speed,
wherein the controller is further configured to:
set a moving path of the drone including a departure point of the drone and an arrival point of the drone based on the first path of the drag touch signal,
set a moving speed of the drone based on the first speed of the drag touch signal,
set a moving altitude of the drone based on the first pressure of the drag touch signal,
control the wireless communication unit to transmit, to the drone, a control signal based on at least one of the set moving path, the set moving speed or the set moving altitude of the drone,
in response to sensing a second touch signal of touching a first area on the map content within a preset time after sensing the first touch signal, transmit a signal for controlling a direction of a camera in the drone for photographing the first area based on the second touch signal,
receive an input of an altitude of the first area through the input unit, and
adjust the direction of the camera based on the received input of the altitude.

2. The mobile terminal of claim 1, wherein the second touch signal is sensed while the first signal is being sensed.

3. The mobile terminal of claim 1, wherein if the second touch signal is not sensed within the preset time after sensing the first touch signal, the controller is further configured to automatically determine and set the first area based on the first path of the first touch signal.

4. The mobile terminal of claim 1, wherein the first pressure corresponds to at least one of a preset pressure sensed from the display unit and a preset distance of a pointer located vertical to the display unit.

5. The mobile terminal of claim 1, wherein the controller is further configured to:
in response to receiving a signal indicating that the drone has arrived at the arrival point, transmit a signal, to the drone, for controlling the drone to return to the departure point.

6. The mobile terminal of claim 1, wherein the controller is further configured to:
in response to sensing a third touch signal after the moving path, the moving altitude and the moving speed of the drone have been set, change the moving path, the moving altitude or the moving speed of the drone based on the third touch signal,
wherein the third touch signal includes a drag touch signal of moving along a second path with a second pressure and a second speed.

7. The mobile terminal of claim 1, wherein the controller is further configured to display an indicator on the map content based on at least one of the set moving path, the moving speed or the moving altitude of the drone.

8. The mobile terminal of claim 1, wherein the controller is further configured to:
transmit a control signal to the drone based on at least one of the departure point of the drone or the arrival point of the drone.

9. A method of controlling a drone, the method comprising:
displaying map content;
sensing a first touch signal of touching at least one partial area of the map content, the first touch signal including a drag touch signal of moving along a first path with a first pressure and a first speed;
setting a moving path including a departure point and an arrival point of a drone based on the first path of the drag touch signal;
setting a moving speed of the drone based on the first speed of the drag touch signal;
setting a moving altitude of the drone based on the first pressure of the drag touch signal;
transmitting a control signal to the drone, via a transceiver, the control signal being based on at least one of the set moving path, the set moving speed or the set moving altitude of the drone;
in response to sensing a second touch signal of touching a first area on the map content within a preset time after sensing the first touch signal, transmitting a signal for controlling a direction of a camera in the drone for photographing the first area based on the second touch signal;
receiving an input of an altitude of the first area; and
adjusting the direction of the camera based on the input of the altitude.

10. The method of claim 9, wherein the second touch signal is sensed while the first signal is being sensed.

11. The method of claim 10, further comprising:
automatically determining and setting the first area based on the first path of the first touch signal when the second touch signal is not sensed within the preset time after sensing the first touch signal.

12. The method of claim 9, wherein the first pressure corresponds to at least one of a preset pressure sensed from a display unit and a preset distance of a pointer located vertical to the display unit.

13. The method of claim 9, further comprising:
in response to receiving a signal indicating that the drone has arrived at the arrival point, transmitting a signal, to the drone, for controlling the drone to return to the departure point.

14. The method of claim 9, further comprising:
in response to sensing a third touch signal after the moving path, the moving altitude and the moving speed of the drone have been set, changing the moving path, the moving altitude or the moving speed of the drone based on the third touch signal,
wherein the third touch signal includes a drag touch signal of moving along a second path with a second pressure and a second speed.

15. The method of claim 10, further comprising:
displaying an indicator on the map content based on at least one of the set moving path, the moving speed or the moving altitude of the drone.

* * * * *